United States Patent
Ito et al.

(10) Patent No.: US 9,375,867 B2
(45) Date of Patent: Jun. 28, 2016

(54) TRANSFER FILM FOR IN-MOLD MOLDING AND METHOD FOR PRODUCING SAME

(75) Inventors: Kenya Ito, Chiba (JP); Koji Ohguma, Chiba (JP); Takuro Tanaka, Chiba (JP); Yuka Takahashi, Chiba (JP); Aki Kuromatsu, Chiba (JP); Mikio Yamahiro, Chiba (JP)

(73) Assignee: JNC CORPORATION, Tokyo (JP)

(*) Notice: Subject to any disclaimer, the term of this patent is extended or adjusted under 35 U.S.C. 154(b) by 106 days.

(21) Appl. No.: 14/127,964

(22) PCT Filed: Jun. 18, 2012

(86) PCT No.: PCT/JP2012/065553
§ 371 (c)(1),
(2), (4) Date: Dec. 19, 2013

(87) PCT Pub. No.: WO2012/176742
PCT Pub. Date: Dec. 27, 2012

(65) Prior Publication Data
US 2014/0113115 A1    Apr. 24, 2014

(30) Foreign Application Priority Data
Jun. 20, 2011 (JP) .................... 2011-136730

(51) Int. Cl.
| | |
|---|---|
| B29C 45/14 | (2006.01) |
| B32B 27/16 | (2006.01) |
| B44C 1/17 | (2006.01) |
| B32B 7/06 | (2006.01) |
| B32B 38/00 | (2006.01) |

(52) U.S. Cl.
CPC .......... *B29C 45/14688* (2013.01); *B29C 45/14* (2013.01); *B29C 45/14811* (2013.01);
(Continued)

(58) Field of Classification Search
CPC  B29C 45/14827; B44C 1/1729; B32B 27/16; B32B 2451/00
USPC ....................................... 428/32.86
See application file for complete search history.

(56) References Cited

U.S. PATENT DOCUMENTS

| | | |
|---|---|---|
| 5,993,588 A | 11/1999 | Nakamura |
| 2005/0181204 A1 | 8/2005 | Wang et al. |
| 2006/0051549 A1* | 3/2006 | Mano .................... C08F 290/06 428/40.1 |

FOREIGN PATENT DOCUMENTS

| | | |
|---|---|---|
| CN | 1328508 | 12/2001 |
| CN | 1708522 | 12/2005 |

(Continued)

OTHER PUBLICATIONS

"Written Opinion of the International Searching Authority (Form PCT/ISA/237)", mailed on Sep. 18, 2012, with English translation thereof, p. 1-p. 7.
(Continued)

*Primary Examiner* — Bruce H Hess
(74) *Attorney, Agent, or Firm* — Jianq Chyun IP Office

(57) ABSTRACT

Provided is a transfer film for in-mold molding which is superior in solvent resistance, heat resistance, durability, blocking resistance, and moldability, and is capable of suppressing the generation of gate flow, and also provided is a method for producing such a film. The film is provided with: a transfer layer (11) which is to be transferred to an in-mold molded body and which is to be cured when irradiated with active energy rays after the transfer; and a film shaped substrate (L0). The transfer layer (11) comprises an IMD layer (L2) laminated on the substrate (L0) and to be arranged on the outermost surface of the molded body after the in-mold molding. The IMD layer (L2) is constituted by a mixture composition containing at least one active-energy curable resin and at least one thermosetting resin.

12 Claims, 3 Drawing Sheets

(52) U.S. Cl.
CPC ............ *B29C45/14827* (2013.01); *B32B 7/06* (2013.01); *B32B 27/16* (2013.01); *B32B 38/0036* (2013.01); *B44C 1/1729* (2013.01); *B32B 2270/00* (2013.01); *B32B 2451/00* (2013.01); *Y10T 428/24851* (2015.01); *Y10T 428/31515* (2015.04); *Y10T 428/31551* (2015.04); *Y10T 428/31554* (2015.04); *Y10T 428/31598* (2015.04); *Y10T 428/31663* (2015.04); *Y10T 428/31946* (2015.04)

(56) References Cited

FOREIGN PATENT DOCUMENTS

| | | |
|---|---|---|
| JP | 02-261614 | 10/1990 |
| JP | 09-176348 | 7/1997 |
| JP | 3233595 | 11/2001 |
| JP | 2004-001350 | 1/2004 |
| JP | 2006-048026 | 2/2006 |
| JP | 4683392 | 5/2011 |

OTHER PUBLICATIONS

"International Search Report (Form PCT/ISA/210)", mailed on Sep. 18, 2012, with English translation thereof, p. 1-p. 4.

"Office Action of China Counterpart Application", issued on Apr. 14, 2015, pp. 1-16.

"Second Office Action of China Counterpart Application", issued on Dec. 24, 2015, pp. 1-12, with partial English translation thereof.

* cited by examiner

TRANSFER FILM FOR IN-MOLD MOLDING AND METHOD FOR PRODUCING SAME

CROSS-REFERENCE TO RELATED APPLICATION

This application is a 371 application of an international PCT application serial no. PCT/JP2012/065553, filed on Jun. 18, 2012, which claims the priority benefit of Japan application no. 2011-136730, filed on Jun. 20, 2011. The entirety of each of the above-mentioned patent applications is hereby incorporated by reference herein and made a part of this specification.

TECHNICAL FIELD

The present invention relates to a transfer film for in-mold molding, and, more particularly, to a transfer film for in-mold molding excellent in solvent resistance, heat resistance, durability, blocking resistance and moldability, and a method for the production thereof.

BACKGROUND ART

"In-mold molding" is a technique used, when injection molding of plastic, ceramic or the like is carried out, to transfer an image or photograph from a film with a design on it placed between mold halves onto a surface of the plastic or the like in the mold simultaneously with the injection molding. A "transfer film for in-mold molding" is a printing film used in an in-mold molding technique in which a transfer layer is peeled off a substrate film and transferred to a molded article as a target of transfer to decorate it or otherwise impart an additional function to it. Transfer films for in-mold molding are widely used to decorate or protect the surface of, for example, the housings of cellular phone terminals, notebook PCs and digital cameras, home electric appliances and cosmetic containers, and automotive parts.

The simultaneous molding and decoration process in which a film is set in the mold for injection molding is divided into two types: IMD (In-Mold Decoration), in which the film (residual film) does not remain on the molded article, and IML (In-Mold Lamination), in which the film remains on the molded article.

Of the two processes, the IMD (In-Mold Decoration) does not require cumbersome steps, such as preforming and trimming, in contrast to IML because the residual film is removed from the molded article after the molding and transfer, and therefore can allow automation and speed-up of the decorating and molding steps. In addition, IMD has a significant effect on improvement of productivity and cost cutting and therefore demonstrates a significant advantage in the production of mass-produced items where economies of scale are required.

A transfer film for in-mold molding is typically composed of a substrate film, a mold release layer, an IMD layer, a print layer and an adhesion layer, and is peeled off at the interface between the mold release layer and the IMD layer after injection molding.

Thus, the molded article has the IMD layer as the outermost layer, and the role of the IMD layer is very important to obtain a molded article excellent in durability, chemical resistance and moldability.

As a method for obtaining a molded article excellent in durability and chemical resistance, a layer composed of an active energy beam-curable resin has been conventionally used as the IMD layer.

One method for the production of a transfer film for in-mold molding is a method in which the film is irradiated with an active energy beam during its production to crosslink and cure (precure) the active energy beam-curable resin. In this method, however, the ability of the IMD layer to conform to the molded article during molding is so poor that the IMD layer tends to develop cracks easily. In order to prevent the occurrence of the cracks, a method is widely adopted in which the film is not irradiated with an active energy beam during its production and the IMD layer as the outermost layer after the transfer onto the molded article is irradiated with an active energy beam to crosslink and cure (aftercare) the active energy beam-curable resin. This method, however, has many problems as described below.

When a film is produced, the active energy beam-curable resin remains runny and sticky when subjected only to a heat-drying process. Thus, problems, such as transfer of the resin to the guide roll and blocking on the reel, occur during a roll-to-roll production process.

In addition, when the resin to be molded is injected into the mold for injection molding, a phenomenon in which the IMD layer or print layer in the vicinity of the injection port (gate) of the mold is caused to flow out by the injected resin (gate flow) can occur.

PRIOR ART DOCUMENT

Patent Document

Patent Document 1 JP-A-Hei02-261614
Patent Document 2 Japanese Patent No. 3233595
Patent Document 2 Japanese Patent No. 4683392

SUMMARY OF THE INVENTION

Problem to be Solved by the Invention

It is, therefore, an object of the present invention to solve the problems of the conventional methods and to provide a transfer film for in-mold molding which is excellent in solvent resistance, heat resistance, durability, blocking resistance and moldability and which can prevent occurrence of gate flow, and a method for the production thereof.

Means for Solving the Problem

The present inventors conducted earnest studies to solve the above problems, and, consequently, found that a transfer film having excellent solvent resistance, heat resistance, durability and blocking resistance even before active energy beam curing can be obtained when a three-dimensional network structure is formed in the IMD layer by mixing an active energy beam-curable resin and an thermosetting resin in the IMD layer and cross-linking the thermosetting resin by a heat-drying step.

The present inventors also found that when an anchor layer is provided as a heat-resistant layer, the adhesion between the IMD layer and the anchor layer can be improved by adding the same thermosetting resin as contained in the IMD layer also to the anchor layer and curing the thermosetting resin.

The present inventors also found that a molded article excellent in solvent resistance, heat resistance and durability can be eventually obtained when an interpenetrating polymer network structure (IPN structure) is formed by irradiating the molded article after the transfer with an active energy beam to cross-link and cure the IMD layer, and accomplished the present invention.

A transfer film for in-mold molding according to the first aspect of the present invention comprises a transfer layer 11 to be transferred onto an in-mold molded article and to be cured by irradiation of an active energy beam after the transfer; and a film-like substrate L0 as shown in FIG. 1(a), for example. The transfer layer 11 has an IMD layer L2 that is laminated on the substrate L0 and will form the outermost layer of the molded article after in-mold molding; and the IMD layer L2 is composed of a mixed composition containing at least one active energy beam-curable resin and at least one thermosetting resin.

The "IMD layer" refers to a layer that forms the outermost layer of the molded article after in-mold molding.

With this configuration, the IMD layer contains an active energy beam-curable resin and a thermosetting resin. Thus, because the thermosetting resin contained in the IMD layer is cured when heated for drying etc. during the film production process, the IMD layer can have solvent resistance, heat resistance, durability, blocking resistance even before the active energy beam-curable resin is cured. As a result, the moldability of the film is improved.

The phrase "laminated on (an xxx layer)" means not only the case of being laminated directly on the xxx layer but also the case of being laminated indirectly on the xxx layer. For example, "a layer laminated on the IMD layer" includes not only a layer laminated directly on the IMD layer but also a layer laminated indirectly on the IMD layer (laminated with another layer therebetween).

As for the transfer film for in-mold molding according to the second aspect of the present invention, in the transfer film for in-mold molding according to the first aspect of the invention, as shown in FIG. 1(a) and FIG. 1(b), for example, the thermosetting resin contained in the IMD layer L2 of the transfer layer 11 has been cured by heating before the transfer.

With this configuration, the IMD layer contains a cured thermosetting resin. As a result, the IMD layer can have sufficient hardness not to have gate flow during injection molding for in-mold molding. On the other hand, because the irradiation of an active energy beam is performed after the transfer, the IMD layer can have sufficient elongation (flexibility) to conform to the mold during injection molding. By curing the active energy beam-curable resin and the thermosetting resin in the IMD layer at different times as described above, the hardness of the IMD layer can be adjusted. Specifically, the thermosetting resin is cured when the IMD layer is laminated to impart a certain degree of hardness and heat resistance to the IMD layer. This prevents gate flow of the IMD layer during injection molding. On the other hand, because the IMD layer contains uncured active energy beam-curable resin, the IMD layer is prevented from developing cracks during injection molding. After in-mold molding, the active energy beam-curable resin is cured by irradiation of an active energy beam to further increase the hardness of the IMD layer.

As for the transfer film for in-mold molding according to the third aspect of the present invention, in the transfer film for in-mold molding according to the first or the second aspect of the invention, the thermosetting resin contains at least one of an epoxy resin, a melamine resin and a urethane resin.

With this configuration, the heat resistance, adhesion, processing suitability and so on of the IMD layer can be further improved.

At least one resin selected as needed from epoxy resins, which are excellent in heat resistance, adhesiveness and chemical resistance, melamine resins, which are excellent in heat resistance, hardness and transparency, and urethane resins, which are excellent in adhesiveness and cold curability, can be used.

As for the transfer film for in-mold molding according to the fourth aspect of the present invention, in the transfer film for in-mold molding according to any one of the first aspect to the third aspect of the invention, as shown in FIG. 1(a) and FIG. 1(b), for example, the IMD layer contains a surface modifying component (FIG. 1(a)) or has a surface modifying layer L2a (FIG. 1(b)) on the surface that will become a surface of the molded article.

With this configuration, the IMD layer contains a surface modifying component or has a surface modifying layer on the surface that will become a surface of the IMD layer. Thus, the durability of the IMD layer itself can be further improved. The surface modifying component or the compound for the surface modifying layer has to be selected as appropriate based on the surface modifying function to be imparted to the IMD layer.

As for the transfer film for in-mold molding according to the fifth aspect of the present invention, in the transfer film for in-mold molding according to the fourth aspect of the invention, the surface modifying component or the surface modifying layer contains one or more selected from a silicone compound, a fluorine compound and a compound containing fluorosilsesquioxane.

With this configuration, the IMD layer can be provided with or improved in an antifouling function by the water/oil repellent effect of the silicone compound, fluorine compound or compound containing fluorosilsesquioxane.

As for the transfer film for in-mold molding according to the sixth aspect of the present invention, in the transfer film for in-mold molding according to any one of the first aspect to the fifth aspect of the invention, as shown in FIG. 1(a), for example, the transfer layer 11 has an anchor layer L3 laminated on the side of the IMD layer L2 opposite the substrate L0 and containing a cured thermosetting resin that enhances the adhesion between the IMD layer L2 and a layer laminated on the IMD layer L2; and at least one thermosetting resin contained in the IMD layer L2 is of the same type as the thermosetting resin contained in the anchor layer L3.

With this configuration, transfer film for in-mold molding has an anchor layer containing a cured thermosetting resin. The anchor layer has heat resistance and can prevent gate flow during injection molding for in-mold molding. In addition, when an additional layer is laminated on the IMD layer, the presence of the anchor layer can improve the adhesion between the IMD layer and the layer laminated thereon. In particular, when the anchor layer and the IMD layer contain the same thermosetting resin, the adhesion between the IMD layer and the anchor layer can be improved.

As for the transfer film for in-mold molding according to the seventh aspect of the present invention, in the transfer film for in-mold molding according to the sixth aspect of the invention, as shown in FIG. 1(a), for example, the transfer layer 11 further includes: a print layer L4 laminated on the anchor layer L3; and an adhesion layer L5 laminated on the print layer L4.

With this configuration, the transfer layer to be transferred during in-mold molding has a print layer and an adhesion layer. Thus, the print layer can be used to provide the resin to be injection-molded with various designs. In addition, the adhesion layer can improve the adhesion between the print layer and the resin to be injection-molded.

A method for the production of an in-mold molded article according to the eighth aspect of the present invention comprises, as shown in FIG. 3, for example, the steps of: placing a transfer film for in-mold molding according to any one of the first aspect to the seventh aspect of the invention on a mold with the substrate L0 facing the mold; and injecting a resin for in-mold molding onto the transfer film for in-mold molding.

With this configuration, the IMD layer contains an active energy beam-curable resin and a thermosetting resin. Thus, because the hardness and heat resistance of the IMD layer can be improved before the step of placing and the step of injecting by curing the thermosetting resin, gate flow can be prevented from occurring during the step of injecting. In addition, when an anchor layer is provided, the anchor layer also contains a thermosetting resin. Thus, the anchor layer also has heat resistance and can prevent gate flow from occurring during the step of injecting.

A method for the production of a transfer film for in-mold molding according to the ninth aspect of the present invention comprises, as shown in FIG. 1(a) and FIG. 2, for example, comprises the steps of: providing a resin for IMD layer L2 by mixing at least one active energy beam-curable resin and at least one thermosetting resin (S02); forming an IMD layer L2 by laminating the resin for IMD layer L2 on a film-like substrate L0 (S02); and heating the resin for IMD layer L2 to crosslink and cure the resin (S02).

With this configuration, the IMD layer contains a cured thermosetting resin. When the hardness and heat resistance of the IMD layer is improved before in-mold molding by curing the thermosetting resin, gate flow can be prevented from occurring during the injection molding.

The method for the production of a transfer film for in-mold molding according to the tenth aspect of the present invention, in the method for the production of a transfer film for in-mold molding according to the ninth aspect of the invention, as shown in FIG. 1(a) and FIG. 2, for example, further comprises the step of: laminating an anchor layer L3 which enhances the adhesion between the IMD layer L2 and a layer laminated on the IMD layer L2 on the side of the IMD layer L2 opposite the substrate L0.

With this configuration, when an additional layer is laminated on the IMD layer, the adhesion between the IMD layer and the layer laminated thereon can be improved by the anchor layer.

A method for the production of an in-mold molded article according to the eleventh aspect of the present invention comprises, as shown in FIG. 3, for example, the steps of: placing a transfer film for in-mold molding produced by the method for the production of an in-mold molded article according to the ninth aspect or the tenth aspect of the invention on a mold with the substrate L0 facing the mold; and injecting a resin for in-mold molding onto the transfer film for in-mold molding.

With this configuration, the IMD layer contains an active energy beam-curable resin and a thermosetting resin. The thermosetting resin has been cured before the step of placing and the step of injecting. Thus, because the hardness and heat resistance of the IMD layer is improved, the IMD layer can prevent gate flow from occurring during the step of injecting.

Effect of the Invention

In the present invention, because the IMD layer contains an active energy beam-curable resin and a thermosetting resin, a transfer film for in-mold molding which is excellent in solvent resistance, heat resistance, durability, blocking resistance and moldability and which can prevent occurrence of gate flow can be obtained.

BRIEF DESCRIPTION OF DRAWINGS

FIG. 1(a) shows a case where an IMD layer L2 contains/does not contain a surface modifying component, and FIG. 1(b) shows a case where an IMD layer L2' has a surface modifying layer L2a.

BEST MODE FOR CARRYING OUT THE INVENTION

The present application is based on Japanese Patent Application No. 2011-136730 applied on Jun. 20, 2011 in Japan. The content forms part thereof as the content of the present application. The invention will be more completely understood by the detailed description provided hereinafter. Further areas of applicability of the invention will become more apparent from the detailed description provided hereinafter. However, it should be understood that the detailed description and specific examples indicate desired embodiments of the invention, and are provided for the purpose of illustration only because it will be apparent to those skilled in the art that various modifications and variations can be made without departing from the spirit or scope of the invention from the detailed description. Applicants have no intention to present any described embodiments to the public, and among modifications and variations, the subject matter that may not be fallen within the scope of claims should also be part of the invention under the doctrine of equivalents.

Hereinafter, the embodiments of the invention will be explained with reference to drawings. In addition, an identical or similar symbol is attached to a mutually identical part or a corresponding part in each drawing, and an overlapped explanation is omitted. Moreover, the invention is in no way limited to embodiments as described below.

[Transfer Film for In-Mold Molding]

Figure 1A:
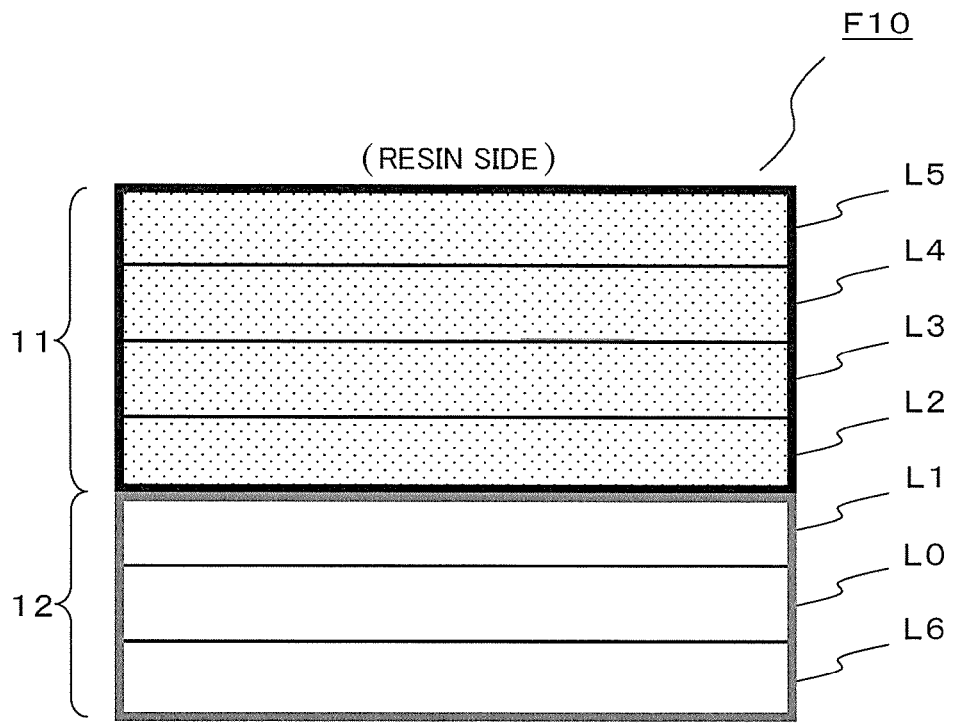
FIG. 1(a) and FIG. 1(b) are diagrams illustrating the layer configuration of a transfer film for in-mold molding.

A transfer film F10 for in-mold molding according to a first embodiment of the present invention is described with reference to FIG. 1(a). It should be noted that FIG. 1(a) illustrates the layer configuration of the transfer film F10 for in-mold molding having a multi-layered structure and the thickness of each layer is exaggerated. The transfer film F10 for in-mold molding comprises a film-like substrate L0 as a substrate, a mold release layer L1, an IMD layer L2, an anchor layer L3, a print layer L4 and an adhesion layer L5.

Figure 3:
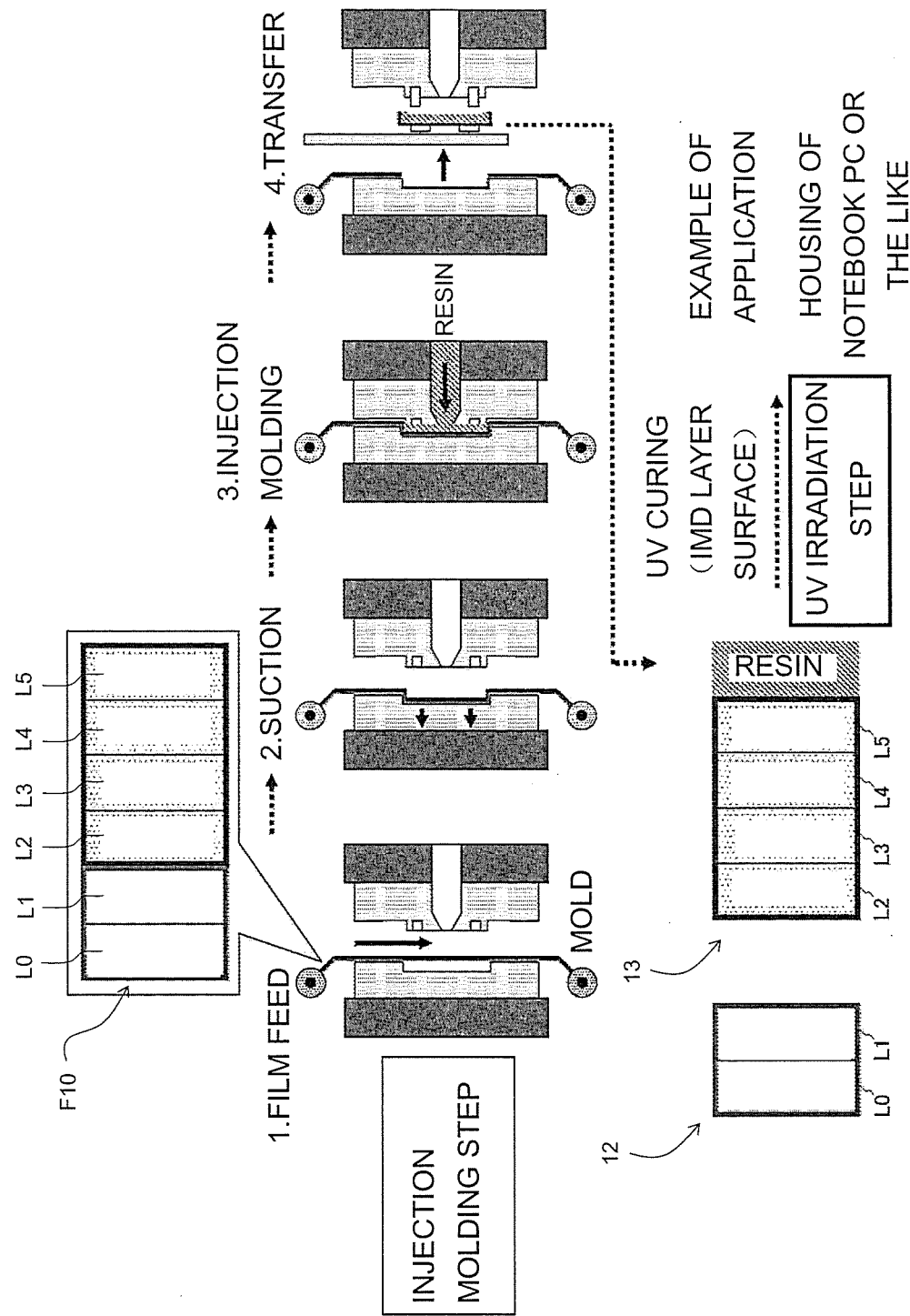
FIG. 3 is a diagram illustrating an example of use of a transfer film for in-mold molding.

In in-mold molding, a resin or the like is injection-molded on one side of the adhesion layer L5 (on the upper side of the adhesion layer L5 in FIG. 1(a)). As shown in FIG. 3, after the injection molding of a resin or the like, the transfer film F10 for in-mold molding is separated at the interface between the mold release layer L1 and the IMD layer L2. A transfer layer 11 (IMD layer L2/anchor layer L3/print layer L4/adhesion layer L5) is transferred onto the resin, and a residual film 12 (substrate L0/mold release layer L1) is separated and left.

[Substrate L0]

The substrate L0 functions as a support during the production of the transfer film F10 for in-mold molding. Various types of plastic film can be used as the film-like polymer resin for the substrate L0. Examples of the material of the plastic film include resins such as polyester resin, acetate resin, polyether sulfone resin, polycarbonate resin, polyimide resin, polyimide resin, polyolefin resin, (meth)acrylic resin, polyvinyl chloride resin, polyvinylidene chloride resin, polystyrene resin, polyvinyl alcohol resin, polyarylate resin, polyphenylene sulfide resin and cyclic polyolefin resin. Specifically, polyethylene terephthalate (PET), polyethylene naphthalate, triacetyl cellulose, polyether sulfone, polycarbonate, polyarylate, polyether ether ketone and so on are preferred. Polyethylene terephthalate (PET) and polyethylene naphthalate are more preferred because they are excellent in mechanical strength, dimensional stability, heat resistance, chemical resistance and optical characteristics and form a film with high surface flatness and handleability. Polycarbonate is more preferred because of its excellent transparency, impact resistance, heat resistance, dimensional stability and flammability. When price and availability are also taken into account, polyethylene terephthalate (PET) is particularly preferred.

The substrate L0 may be provided with mold releasability. When the substrate L0 is provided with mold releasability, the mold release layer L1, which is described later, can be omitted because the transfer layer 11 (the IMD layer L2 and so on) can be easily peeled off the substrate L0.

The substrate L0 preferably has a thickness of 10 to 100 µm, more preferably 25 to 50 µm. When the thickness of the substrate L0 is 10 µm or greater, the substrate can maintain mechanical strength and each layer of the transfer film F10 for in-mold molding can be formed easily. When the thickness is 100 µm or less, the transfer film F10 for in-mold molding can maintain flexibility suitable for in-mold molding (in particular, the ability to conform to the mold).

[Mold Release Layer L1]

The mold release layer L1 is a layer for making it easy to peel the transfer layer 11 (the IMD layer L2 and so on) off the substrate L0. When the substrate L0 has mold releasability, the mold release layer L1 may be omitted. Examples of the material of the mold release layer L1 include melamine resin, polyolefin resin, epoxy resin, amino-alkyd resin, silicone resin, fluorine resin, acrylic resin, paraffin resin, urea resin and fiber resin. In view of the stability during removal from the transfer layer 11 and transferability to the transfer layer 11, melamine resins, such as methylated melamine resin, butylated melamine resin, methyl-etherified melamine resin, butyl-etherified melamine resin and methyl-butyl mixed-etherified melamine resin, and polyolefin resins, such as polyethylene and polypropylene, are more preferred.

The mold release layer L1 preferably has a thickness of 0.01 to 5 µm, more preferably 0.5 to 3 µm. When the thickness of the mold release layer L1 is 0.01 µm or greater, stable mold releasability can be imparted to the substrate L0. When the thickness is 5 µm or less, the mold release layer L1 is prevented from transferring to the IMD layer L2 or the IMD layer L2 is prevented from remaining on the mold release layer L1.

The mold release layer L1 is laminated by applying a coating liquid composed primarily of the resin as described above on the substrate L0 and drying and curing the resulting coated film by heating.

The coating liquid is prepared by mixing the resin with various additives and a solvent as needed. The concentration of the resin component in the coating liquid can be selected appropriately by adjusting its viscosity to a level suitable for the laminating method, such as wet coating. The concentration is preferably in the range of 5 to 80% by weight, for example, more preferably 10 to 60% by weight. Examples of the solvent that can be used include methyl isobutyl ketone, methyl ethyl ketone, butyl acetate, ethyl acetate, toluene, xylene, butanol and ethylene glycol monoethyl acetate.

Because the resin is used as a coating liquid, a curable resin which is liquid before being cured is preferred.

A wet coating method, by which a coating liquid can be uniformly coated, is preferably used to laminate the mold release layer L1. Examples of the wet coating method that can be used include gravure coating and die coating. Gravure coating is a process in which a gravure roll having an engraved surface is immersed into a coating liquid and then the coating liquid on the engraved surface of the gravure roll is scraped off with a doctor blade so that a precise amount of coating liquid can remain in the recesses and be transferred onto a substrate. A liquid with a low viscosity can be coated into a thin layer by gravure coating. Die coating is a process in which coating is made by extruding a liquid from a coating head called die under pressure. Die coating can provide high-accuracy coating. In addition, the coating liquid is less likely to undergo a change in concentration and so on due to drying because the liquid is not exposed to the ambient air during application. Other examples of the wet coating method include spin coating, bar coating, reverse coating, roll coating, slit coating, dipping, spray coating, kiss coating, reverse kiss coating, airknife coating, curtain coating and rod coating. The lamination is carried out by a method selected from these methods as appropriate based on the desired film thickness.

In addition, when a wet coating method is used, a large scale-production can be done with high production efficiency because coating liquid can be applied at a line speed of a few dozen meters per minute (such as approximately 20 m/min).

When a thermosetting resin is cured by heating, the resin is usually heated at a heating temperature of 80 to 160° C., for example, preferably 120 to 150° C. At this time, the heating is carried out for 10 to 120 seconds when an oven is used.

[IMD Layer L2]

The IMD layer L2 is a layer that forms the outermost layer of the molded article after in-mold molding, and functions as a surface protecting layer. The IMD layer L2 contains an active energy beam-curable resin and a thermosetting resin.

The term "active energy beam" as used herein means an energy beam which can decompose a compound that generates an active species to generate an active species. Examples of the active energy beam include optical energy beams such as visible light, ultraviolet rays, infrared rays, X-rays, α-rays, β-rays, γ-rays and electron beam.

Preferred examples of the active energy beam-curable resin include resins having an unsaturated bond capable of radical polymerization such as (meth)acrylate monomer, unsaturated polyester resin, polyester (meth)acrylate resin, epoxy (meth)acrylate resin and urethane (meth)acrylate resin. These resins may be used singly or in combination of two or more.

Examples of the (meth)acrylate monomer include compounds obtained by reacting a polyhydric alcohol with an α,β-unsaturated carboxylic acid. Examples include polyalkylene glycol di(meth)acrylate, ethylene glycol(meth)acrylate, propylene glycol(meth)acrylate, polyethylene polytrimethylolpropane di(meth)acrylate, trimethylolpropane tri(meth)acrylate, trimethylolpropane ethoxy tri(meth)acrylate, trimethylolpropane diethoxy tri(meth)acrylate, trimethylolpropane triethoxy tri(meth)acrylate, trimethylolpropane tetraethoxy tri(meth)acrylate, trimethylolpropane pentaethoxy tri(meth)acrylate, tetramethylolmethane tetra(meth)acrylate, tetramethylolpropane tetra(meth)acrylate, pentaerythritol tri(meth)acrylate, pentaerythritol tetra(meth)acrylate, pentaerythritol penta(meth)acrylate, dipentaerythritol penta(meth)acrylate, dipentaerythritol hexa(meth)acrylate and (meth)acrylates having a cyclic structure. Specific examples of the (meth)acrylates having a cyclic structure include dicyclopentanyl(meth)acrylate, dicyclopentenyl (meth)acrylate, dicyclopentenyloxyethyl(meth)acrylate, isobornyl(meth)acrylate, tricyclodecane dimethanol di(meth)acrylate, mono- and di(meth)acrylate having a terpene skeleton, and photopolymerizable monomers such as (meth)acrylates modified either with ethylene glycol or propylene glycol.

Examples of the unsaturated polyester resin include resins prepared by dissolving a condensation product (unsaturated polyester), resulting from an esterification reaction between a polyhydric alcohol and an unsaturated polybasic acid (and optionally a saturated polybasic acid), in a polymerizable monomer.

The unsaturated polyester can be produced by polycondensation of an unsaturated acid, such as maleic anhydride, with a diol, such as ethylene glycol. Specific examples include reaction products of an acid component composed of a polybasic acid, having a polymerizable unsaturated bond such as fumaric acid, maleic acid or itaconic acid, or an anhydride thereof, with an alcohol component composed of a polyhydric alcohol, such as ethylene glycol, propylene glycol, diethylene glycol, dipropylene glycol, 1,2-butanediol, 1,3-butanediol, 1,5-pentane diol, 1,6-hexane diol, 2-methyl-1,3-propanediol, 2,2-dimethyl-1,3-propanediol, cyclohexane-1,4-dimethanol, ethylene oxide adduct of bisphenol A or propylene oxide adduct of bisphenol A. When necessary, a polybasic acid, having no polymerizable unsaturated bond such as phthalic acid, isophthalic acid, terephthalic acid, tetrahydrophthalic acid, adipic acid or sebacic acid, or an anhydride thereof may be added as an acid component.

Examples of the polyester (meth)acrylate resin include (1) (meth)acrylate obtained by reacting a carboxyl-terminated polyester obtained from a saturated polybasic acid and/or an unsaturated polybasic acid and a polyhydric alcohol with an epoxy compound containing an α,β-unsaturated carboxylic acid ester, (2) (meth)acrylate obtained by reacting a carboxyl-terminated polyester obtained from a saturated polybasic acid and/or an unsaturated polybasic acid and a polyhydric alcohol with a hydroxyl group-containing acrylate, and (3) (meth)acrylate obtained by reacting a hydroxyl-terminated polyester obtained from a saturated polybasic acid and/or an unsaturated polybasic acid and a polyhydric alcohol with a (meth) acrylic acid.

Examples of the saturated polybasic acid used as an ingredient of the polyester (meth)acrylate include polybasic acids having no polymerizable unsaturated bond, such as phthalic acid, isophthalic acid, terephthalic acid, tetrahydrophthalic acid, adipic acid and sebacic acid, and anhydrides thereof, and polymerizable unsaturated polybasic acid, such as fumaric acid, maleic acid and itaconic acid, and anhydrides thereof. Examples of the polyhydric alcohol component are the same as those for the unsaturated polyester.

Examples of the epoxy (meth)acrylate resin that can be used for the present invention include resins prepared by dissolving a compound (vinyl ester) having a polymerizable unsaturated bond which is formed by a ring-opening reaction of a compound having a glycidyl group (epoxy group) with the carboxyl groups of a carboxyl compound having a polymerizable unsaturated bond, such as acrylic acid, in a polymerizable monomer.

The vinyl ester may be produced by a heretofore known method. Examples include epoxy (meth)acrylates obtained by reacting an epoxy resin with an unsaturated monobasic acid, such as acrylic acid or methacrylic acid.

Epoxy resins of various types may be reacted with a bisphenol (such as bisphenol A) or a dibasic acid, such as adipic acid, sebacic acid or dimer acid (Haridimer 270S: Harima Chemicals Group, Inc.), to impart flexibility to the resins.

Examples of the epoxy resin as an ingredient include bisphenol A diglycidyl ether and high-molecular weight homologues thereof, and novolak-type glycidyl ethers.

Examples of the urethane (meth)acrylate resin include a radical polymerizable unsaturated group-containing oligomer obtained by reacting a polyisocyanate with a polyhydroxy compound or polyhydric alcohols and then reacting the reaction product with a hydroxyl group-containing (meth)acryl compound and optionally a hydroxyl group-containing allyl ether compound.

Specific examples of the polyisocyanate include 2,4-tolylenediisocyanate and isomers thereof, diphenylmethane diisocyanate, hexamethylene diisocyanate, hydrogenated xylylene diisocyanate, isophorone diisocyanate, xylylene diisocyanate, dicyclohexylmethane diisocyanate, naphthaline diisocyanate, triphenylmethane triisocyanate, Burnock D-750 and Crisvon NK (trade names: manufactured by DIC Corporation), Desmodule L (trade name: manufactured by Sumitomo Bayer Urethane Co., Ltd.), Coronate L (trade name: manufactured by Nippon Polyurethane Industry Co., Ltd.), Takenate D102 (trade name: manufactured by Mitsui Takeda Chemicals Inc.) and Isonate 143L (trade name: manufactured by Mitsubishi Chemical Corporation).

Examples of the polyhydroxy compound include polyester polyol and polyether polyol, and specific examples thereof include glycerin-ethylene oxide adduct, glycerin-propylene oxide adduct, glycerin-tetrahydrofuran adduct, glycerin-ethylene oxide-propylene oxide adduct, trimethylolpropane-ethylene oxide adduct, trimethylolpropane-propylene oxide adduct, trimethylolpropane-tetrahydrofuran adduct, trimethylolpropane-ethylene oxide-propylene oxide adduct, dipentaerythritol-ethylene oxide adduct, dipentaerythritol-propylene oxide adduct, dipentaerythritol-tetrahydrofuran adduct and dipentaerythritol-ethylene oxide-propylene oxide adduct.

Specific examples of the polyhydric alcohols include ethylene glycol, diethylene glycol, triethylene glycol, polyethylene glycol, propylene glycol, dipropylene glycol, polypropylene glycol, 2-methyl-1,3-propanediol, 1,3-butanediol, adducts of bisphenol A with propylene oxide or ethylene oxide, 1,2,3,4-tetrahydroxybutane, glycerin, trimethylolpropane, 1,3-butane diol, 1,2-cyclohexane glycol, 1,3-cyclohexane glycol, 1,4-cyclohexane glycol, paraxylene glycol, bicyclohexyl-4,4-diol, 2,6-decalin glycol and 2,7-decalin glycol.

The hydroxyl group-containing (meth)acryl compound is not particularly limited and is preferably a hydroxyl group-containing (meth)acrylic acid ester. Specific examples include 2-hydroxyethyl(meth)acrylate, 2-hydroxypropyl (meth)acrylate, 3-hydroxybutyl(meth)acrylate, polyethylene glycol mono(meth)acrylate, polypropylene glycol mono (meth)acrylate, di(meth)acrylate of tris(hydroxyethyl)isocyanuric acid and pentaerythritol tri(meth)acrylate.

Examples of the thermosetting resin include phenol resin, alkyd resin, melamine resin, epoxy resin, urea resin, unsaturated polyester resin, urethane resin, thermosetting polyimide and silicone resin. These resins may be used singly or in combination of two or more.

Specifically, epoxy resins, such as bisphenol A-type epoxy resin, bisphenol F-type epoxy resin, multifunctional epoxy resin, flexible epoxy resin, brominated epoxy resin, glycidyl ester-type epoxy resin, high-molecular-weight epoxy resin and biphenyl-type epoxy resin, melamine resins, such as methylated melamine resin, butylated melamine resin, methyl etherified melamine resin, butyl etherified melamine resin and methyl-butyl mixed-etherified melamine resin, and urethane resins obtained by a reaction of a polyisocyanate compound having two or more isocyanate groups (O═C═N—R—N═C═O) with a polyol compound having two or more hydroxyl groups (HO—R'—OH), a polyamine (H$_2$N—R"—NH$_2$) or a compound having an active hydrogen (such as —NH$_2$, —NH or —CONH—), such as water, are preferred from the viewpoint of processing suitability.

At least one resin selected as needed from epoxy resins, which are excellent in heat resistance, adhesiveness and chemical resistance, melamine resins, which are excellent in heat resistance, hardness and transparency, and urethane resins, which are excellent in adhesiveness and cold curability, can be used.

The active energy beam-curable resin can be cured preferably by irradiation of ultraviolet rays (UV) or an electron beam from an active energy beam source.

A case where the active energy beam-curable resin is used upon UV irradiation is described. The active energy beam-curable resin is preferably one that is cured by polymerization induced by UV irradiation in the presence of a photopolymerization initiator. Examples of the photopolymerization initiator include various types of benzoin derivatives, benzophenone derivatives, phenylketone derivatives, onium salt photoinitiators, organic metal photoinitiators, metal salt cationic photoinitiators, photodegradable organosilane, latent sulfonic acid and phosphine oxide. The photopolymerization initiator is preferably added in an amount of 1 to 5 parts by weight based on 100 parts by weight of the active energy beam-curable resin.

The thermosetting resin has to be cured quickly at a desired curing temperature (80 to 160° C.) within a desired period of time (30 to 180 seconds). Depending on the type of the resin, a curing reaction initiator or curing reaction accelerator may be used. Examples in the case of an epoxy resin include amines such as aliphatic amines and aromatic amines, polyamide resin, tertiary and secondary amines, imidazoles, polymercaptan, acid anhydrides, Lewis acid complexes, examples in the case of a melamine resin include sulfonic acid-based catalyst, and examples in the case of a urethane resin include organic metal-based urethanated catalysts and tertiary amine-based urethanated catalysts.

The active energy beam-curable resin and the thermosetting resin are preferably mixed at a weight ratio of 80:20 to 30:70. When the thermosetting resin constitutes 20% by weight or more, it is possible to enable the IMD layer L2 to exhibit heat resistance and solvent resistance. When the thermosetting resin constitutes 70% by weight or less, the IMD layer L2 (in particular, its ability to conform to the mold) is suitable for in-mold molding.

The IMD layer L2 preferably has a thickness of 0.1 to 50 μm, more preferably 1 to 20 μm. When the thickness of the IMD layer L2 is 0.1 μm or greater, a decrease in durability or chemical resistance is unlikely to occur because a cross-linked structure is easily formed by the thermosetting resin. When the thickness is 50 μm or less, it is possible to prevent the coated film after curing from having insufficient hardness or durability caused by an increase of the amount of solvent left unremoved during solvent drying.

The IMD layer L2 is laminated by applying a coating liquid composed primarily of the resin as described above on the mold release layer L1 and drying and curing the resulting coated film by heating. The coating liquid may contain, in addition to the resin, various additives, such as wax, silica, plasticizer, leveling agent, surfactant, dispersant and antifoaming agent, and a solvent as needed. A wet coating method, by which a coating liquid can be uniformly coated, is preferably used to laminate the IMD layer L2.

The IMD layer L2 is formed under conditions under which the thermosetting resin can be cured by heating. For example, the heating is usually carried out at a heating temperature of 80 to 160° C., preferably 120 to 150° C. At this time, the heating is carried out for 30 to 180 seconds when an oven is used. When the heating temperature is too low or the heating period is too short, the solvent may remain and cause insufficient cross-linking and curing of the thermosetting resin. When the heating temperature is too high or the heating period is too long, the substrate film develops heat waves. It is preferred to select proper processing conditions as needed based on the types and mixing ratio of the resins.

Figure 1B:
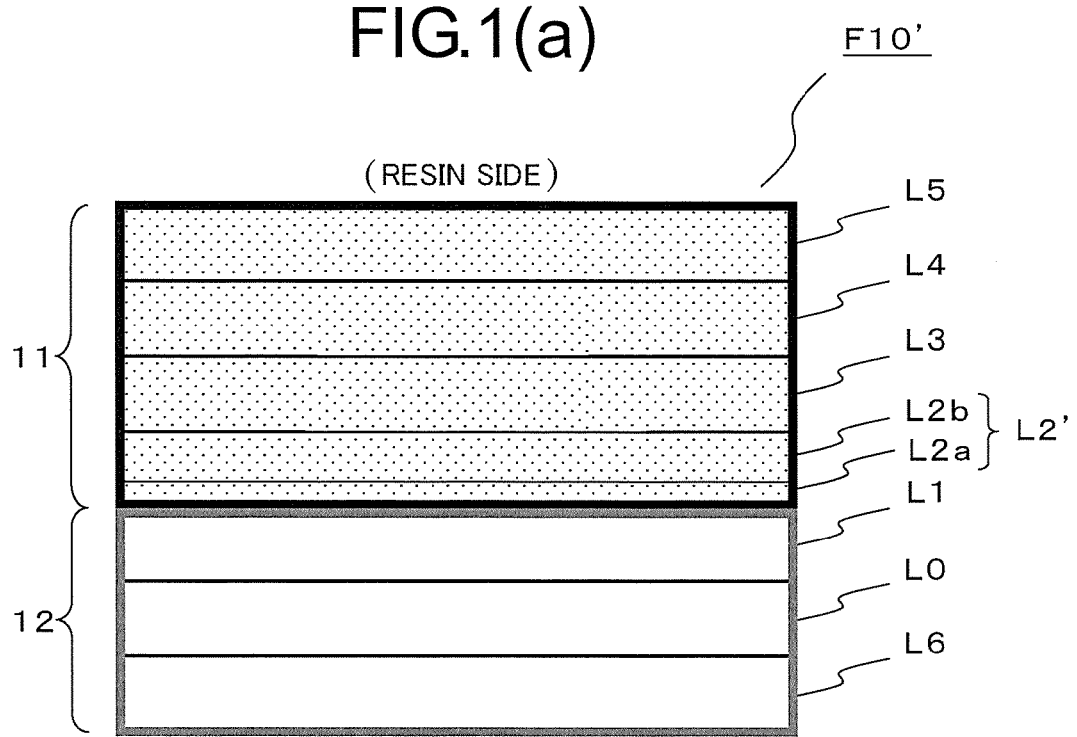

The IMD layer may be provided with a surface modifying function. For example, a water/oil repellent function or antifouling function may be provided using a surface modifier, such as a silicone compound, a fluorine compound or a compound containing fluorosilsesquioxane. An antireflection function may be provided by performing an antireflection treatment (AR treatment) using an organic or inorganic low-refractive index material or a highly-refractive material. An antiglare function may be provided using an antiglare treatment agent containing organic or inorganic particles, for example. A fingerprint transfer reducing or preventing function may be provided by further adjusting the water/oil repellency. The surface modification of the IMD layer can be achieved by forming the IMD layer L2 after adding a compound that exhibits a surface modifying function to the coating liquid for the IMD layer L2 as shown in FIG. 1(a). Alternatively, a surface modifying layer L2a containing a compound that exhibits a surface modifying function may be formed to form an IMD layer L2' having a surface modifying layer L2a as shown in FIG. 1(b). The compound (resin, for example) that exhibits a surface modifying function is preferably selected as appropriate based on the required functions.

When an IMD layer L2' having a surface modifying layer is formed, a coating liquid composed primarily of a compound that exhibits a surface modifying function is first prepared and applied to the mold release layer L1. Then, the obtained coated film is cured by heating and drying as needed (formation of L2a). Then, the coating liquid for the IMD layer L2 is applied to the surface modifying layer L2a, and the resulting coated film is cured by heating and drying (formation of L2b). In this case, because the substrate L0 and the mold release layer L1 are peeled off and removed from the transfer film for in-mold molding during the transfer, the IMD layer L2' having a surface modifying layer L2a on the obverse side can be formed.

An antifouling function may be imparted to the IMD layer as a surface modifying function using an antifouling agent which can reduce adhesion of dirt. The use of one or more compounds selected from the group consisting of silicone compounds, fluorine compounds, fluorosilsesquioxane, and fluorosilsesquioxane polymers described in WO2008/072766 and WO2008/072765 as the antifouling agent is preferred.

Examples of the silicone compounds include BYK-UV3500 and BYK-UV-3570 (which are manufactured by BYK Japan KK), TEGO Rad2100, 2200N, 2250, 2500, 2600 and 2700 (which are manufactured by Degussa), and X-22-2445, X-22-2455, X-22-2457, X-22-2458, X-22-2459, X-22-1602, X-22-1603, X-22-1615, X-22-1616, X-22-1618, X-22-1619, X-22-2404, X-22-2474, X-22-174DX, X-22-8201, X-22-2426, X-22-164A and X-22-164C (which are manufactured by Shin-Etsu Chemical Co., Ltd.).

Examples of the fluorine compounds include Optool DAC, Optool DAC-HP, R-1110, R-1210, R-1240, R-1620, R-1820, R-2020, R-5210, R-5410, R-5610, R-5810, R-7210 and R-7310 manufactured by Daikin Industries, Ltd.

The compound that exhibits a surface modifying function may be a fluorosilsesquioxane compound having a molecular structure represented by formula (I) below or a polymer (homopolymer or copolymer) containing the fluorosilsesquioxane compound, for example. Because a polymer polymerized using the compound represented by formula (I) below is a fluorine-based silicone compound, a function of reducing the adhesion of dirt can be imparted to the IMD layer L2 (L2'). As shown in Examples 5 and 6, the polymer not only can actually increase the hardness of the IMD layer L2 but also provide improvement of the water/oil repellency, which leads to the impartation of antifouling and fingerprint-resistant functions, by reducing the surface free energy.

[Chemical Formula 1]

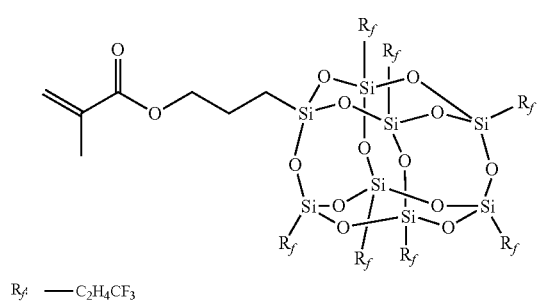

(I)

$R_f$ —— $C_2H_4CF_3$

When a compound that exhibits a surface modifying function is added to the coating liquid for the IMD layer L2, the compound is preferably added directly to the coating liquid or added after dissolving the compound in an organic solvent. The compound is preferably added in an amount of 0.1 to 20% by weight based on the total amount of the resins (the active energy beam-curable resin and thermosetting resin) necessary for the formation of the IMD layer. When the proportion of the compound that exhibits a surface modifying function is 20% by weight or more, the curability of the resins necessary for the formation of the IMD layer tends to be inhibited, resulting in poor adhesion. When the proportion is 0.1% by weight or less, it is difficult to enable the IMD layer to exhibit a sufficient surface modifying function.

When the IMD layer L2' having a surface modifying layer is formed, the compound is dissolved in an organic solvent to prepare an additional coating liquid, for example. A wet coating method, by which a coating liquid can be uniformly coated, is preferably used for the application of the coating liquid. In view of the coating properties, the coating liquid for the surface modifying layer L2a is preferably used with the content of the compound being approximately 10 to 80% by weight. The surface modifying layer L2a preferably has a thickness of 0.01 to 10 µm. When the thickness is 0.01 µm or greater, it is possible to enable the surface modifying layer L2a to exhibit a surface modifying function. When the thickness is 10 µm or less, it is possible to prevent the coated film after curing from having insufficient hardness or durability caused by an increase of the amount of solvent left unremoved during solvent drying.

[Anchor Layer L3]

The anchor layer L3 is described with reference to FIG. 1(a). The anchor layer L3 is a layer used to improve the adhesion (bond) between the IMD layer L2 and the layers laminated on the IMD layer L2. Examples of the material of the anchor layer L3 include thermosetting resins such as phenol resin, alkyd resin, melamine resin, epoxy resin, urea resin, unsaturated polyester resin, urethane resin, thermosetting polyimide and silicone resin, and thermoplastic resins such as vinyl chloride-vinyl acetate copolymer resin, acrylic resin, chlorinated rubber, polyamide resin, nitrocellulose resin, polyamide resin and cyclic polyolefin resin.

Specifically, epoxy resins, such as bisphenol A-type epoxy resin, bisphenol F-type epoxy resin, multifunctional epoxy resin, flexible epoxy resin, brominated epoxy resin, glycidyl ester-type epoxy resin, high-molecular-weight epoxy resin and biphenyl-type epoxy resin, melamine resins, such as methylated melamine resin, butylated melamine resin, methyl etherified melamine resin, butyl etherified melamine resin and methyl-butyl mixed-etherified melamine resin, and urethane resins obtained by a reaction of a polyisocyanate compound having two or more isocyanate groups (O=C=N—R—N=C=O) with a polyol compound having two or more hydroxyl groups (HO—R'—OH), a polyamine ($H_2N$—R"—$NH_2$) or a compound having an active hydrogen (such as —$NH_2$, —NH or —CONH—), such as water, are preferred from the viewpoint of processing suitability.

The anchor layer L3 may be composed of a plurality of thermosetting resins. For example, the anchor layer L3 may be composed of an epoxy resin and a urethane resin. The adhesion between the anchor layer L3 and the IMD layer L2 can be improved by adding an epoxy resin to both the anchor layer L3 and the IMD layer L2. The adhesion between the anchor layer L3 and the print layer L4 can be improved by adding a urethane resin to both the anchor layer L3 and the print layer L4. By improving the adhesion between the IMD layer L2 and the anchor layer L3 and between the anchor layer L3 and the print layer L4, separation between the layers can be prevented and a film excellent in durability can be therefore produced.

When a urethane resin is used, the layers can maintain stretching property and have thermosetting property simultaneously. Thus, the layers can maintain sufficient elongation (flexibility) to conform to the mold during the injection molding.

When an epoxy resin and a urethane resin are used in the anchor layer, the epoxy resin and the urethane resin are preferably mixed at a weight ratio of 5:95 to 50:50. When the epoxy resin constitutes 5% by weight or more, the adhesion to the IMD layer L2 can be improved. When the epoxy resin constitutes 50% by weight or less, the anchor layer (in particular, its ability to conform to the mold) is suitable for in-mold molding.

The anchor layer L3 preferably has a thickness of 0.1 to 50 µm, more preferably 0.5 to 10 µm. When the thickness of the anchor layer L3 is 0.1 µm or greater, a decrease in durability or chemical resistance is unlikely to occur because a cross-linked structure is easily formed by the thermosetting resin. When the thickness is 50 µm or less, it is possible to prevent the anchor layer L3 from having insufficient blocking resistance caused by an increase of the amount of solvent left unremoved during solvent drying.

The anchor layer L3 is laminated by applying a coating liquid composed primarily of the resin as described above on the IMD layer L2 and drying and curing the resulting coated film by heating. The coating liquid may contain, in addition to the resin, various additives, such as wax, silica, plasticizer, leveling agent, surfactant, dispersant and antifoaming agent, and a solvent as needed. A wet coating method, by which a coating liquid can be uniformly coated, is preferably used to laminate the anchor layer L3.

The anchor layer L3 is formed under conditions under which the thermosetting resin can be cured by heating. For example, the heating is usually carried out at a heating temperature of 80 to 160° C., preferably 120 to 150° C. At this time, the heating is carried out for 30 to 180 seconds when an oven is used. When the heating temperature is too low or the heating period is too short, the solvent may remain and cause insufficient cross-linking and curing of the thermosetting resin. When the heating temperature is too high or the heating period is too long, the substrate film develops heat waves. Proper processing conditions should be selected as needed based on the types and mixing ratio of the resins.

A UV absorber, a UV stabilizer and an antioxidant may be added to the anchor layer L3 as needed for the purpose of preventing deterioration, change in color and so on of the print layer.

Specifically, examples of the UV absorber include benzotriazoles, hydroxyphenyl triazines, benzophenones, salicates, cyanoacrylates and triazines. Examples of the UV stabilizer include hindered amine light stabilizers. Examples of the antioxidant include phenol-based, sulfur-based and phosphoric acid-based antioxidants.

The additives are preferably added in an amount of 0.01 to 20 parts by weight based on 100 parts by weight of the resins that form the anchor layer L3.

[Print Layer L4/Adhesion Layer L5]

The print layer L4 and the adhesion layer L5 are described with reference to FIG. 1(a). A print layer L4 used to provide the transfer film F10 for in-mold molding with decoration, such as pictures, and an adhesion layer L5 used to bond the print layer L4 to the resin or the like to be injection-molded during the in-mold molding are formed on the anchor layer L3.

As shown in FIG. 1(a), a protective layer L6 may be provided on one side of the substrate L0 (the lower side of the substrate L0 in FIG. 1(a)) for anti-blocking or anti-static purpose. When the protective layer L6 has an anti-blocking property, the film can be prevented from blocking when the film is wound on a roll during the process of production of the film. When the protective layer L6 has an anti-static property, the film can be prevented from peeling electrification when the film is unwound from the roll during the process of production of the film.

As the material for constituting the protective layer L6, a coating agent containing various inorganic particles, organic particles, a quaternary ammonium salt, siloxane, a surfactant and so on may be used.

[Method for Production of Transfer Film for In-Mold Molding]

Figure 2:
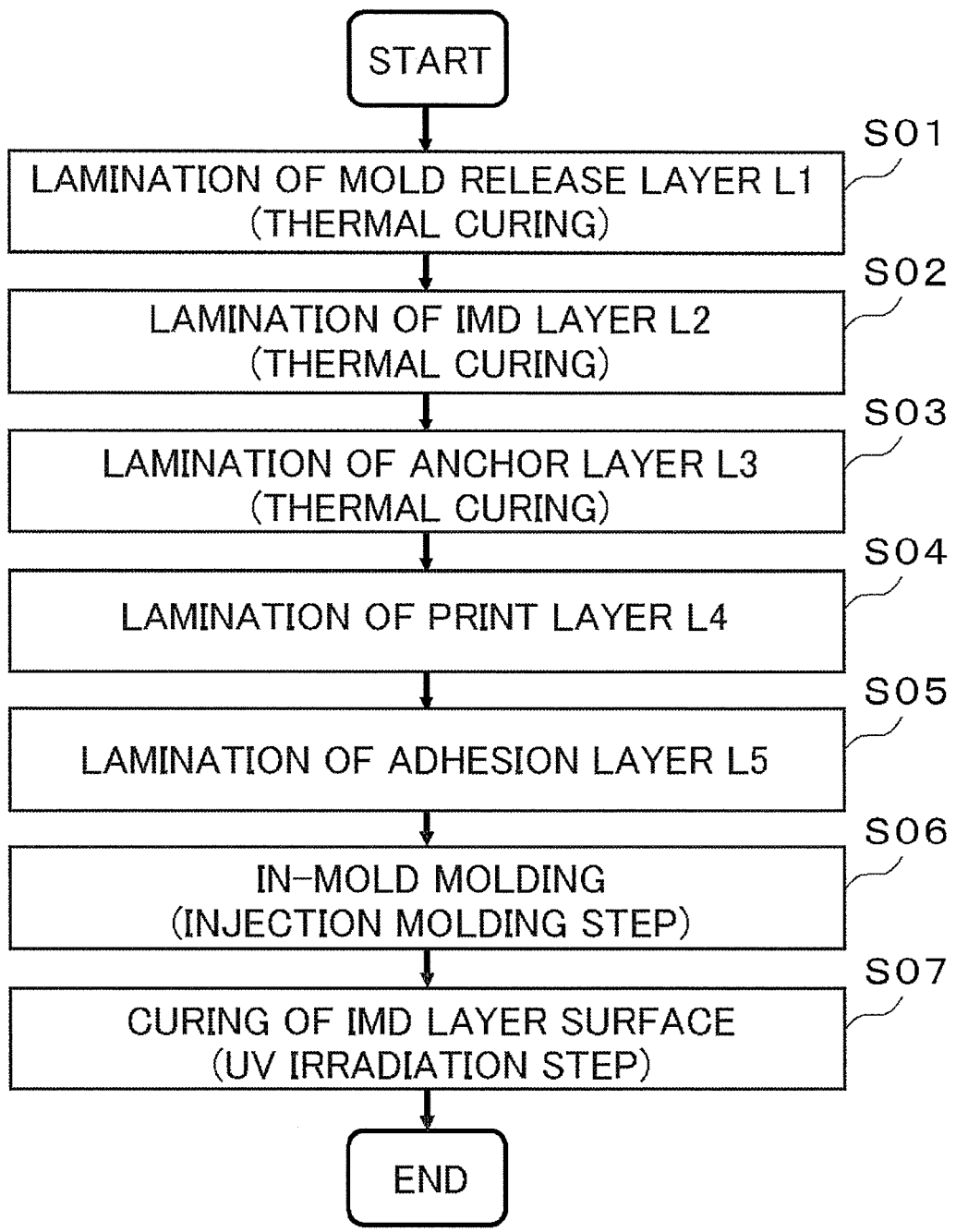
FIG. 2 is a diagram illustrating the flow of a method for the production of a transfer film for in-mold molding.

A method for production of a transfer film for in-mold molding according to a second embodiment of the present invention is described with reference to FIG. 1(a) and FIG. 2. In this embodiment, a case where the mold release layer L1 is laminated but the protective layer L6 is omitted is described. However, when the substrate L0 has mold releasability, the mold release layer L1 may be also omitted. First, the mold release layer L1 is laminated on one side of the substrate L0 by a wet coating method and thermally cured (S01). Then, the IMD layer L2 is laminated on the mold release layer L1 by a wet coating method and thermally cured (S02). Then, the anchor layer L3 is laminated on the IMD layer L2 by a wet coating method and thermally cured (S03). In addition, the print layer L4 is laminated on the anchor layer L3 (S04). Finally, the adhesion layer L5 is laminated on the print layer L4 (S05). Because a wet coating method is used to laminate the layers, the lamination can be carried out with high productivity at a line speed of a few dozen meters per minute (such as approximately 20 m/min). Because each layer is thermally cured every time wet coating is performed in steps S01 to S03, the coating liquids can be prevented from being mixed and each layer can be therefore formed reliably. The thermal curing is preferably carried out to such a degree that the elongation of the layers necessary for the injection molding as a subsequent process is not hindered.

During the in-mold molding (in the injection molding step S06), which is described later, the transfer layer is transferred from the produced transfer film for in-mold molding to the resin to be injection-molded and is peeled off the transfer film for in-mold molding (the residual film remains). In this way, an in-mold molded article is formed of the transfer layer and the resin. The transferred transfer layer is irradiated with an active energy beam (such as UV) to cure the surface of the IMD layer (S07). As a result, the contained active energy beam-curable resin is cured and the hardness of the IMD layer as the outermost layer of the in-mold molded article is further improved.

In the case of the transfer film for in-mold molding produced by the method for the production of a transfer film for in-mold molding, the IMD layer L2 is composed of a mixture of a thermosetting resin and an active energy beam-curable resin. When the thermosetting resin contained in the IMD layer L2 is cured by heating (during drying, for example) before the in-mold molding, the IMD layer L2 has a certain degree of hardness even before the irradiation of an active energy beam (such as UV).

In the injection molding for in-mold molding, the resin is injected into the mold through one pin gate or valve gate and expanded to form an in-mold molded article. During the injection molding, heat and pressure are applied to the part of the film with which the resin melted to a certain degree (approximately 260° C.) comes into contact. Thus, gate flow, a phenomenon in which the layers in the part of the film flow, occurs.

In the transfer film for in-mold molding of this application, the gate flow is prevented by thermally curing the IMD layer L2 and thermally curing the anchor layer L3. On the other hand, because the IMD layer L2 contains an uncured active energy beam-curable resin, the IMD layer L2 can maintain moldability (in particular, the ability to conform to the mold) necessary for the injection molding.

As described above, the method for the production of a transfer film for in-mold molding of this application can produce a transfer film for in-mold molding excellent not only in moldability, heat resistance, and durability but also in blocking resistance and solvent resistance.

FIG. 3 illustrates an example of use of a transfer film for in-mold molding.

[In-Mold Molding (Injection Molding Step S06)]

An injection molding step S06 is described using a transfer film for in-mold molding (IMD film F10) produced by the method for the production of a transfer film for in-mold molding. It should be noted that the IMD film F10 does not have a protective layer L6.

1. Film Feed

The IMD film F10 is supplied from a film feeding device with its substrate PET side facing a mold half (the mold half on the left-hand side in FIG. 3), and the IMD film F10 is directed to a prescribed position by a sensor fixed to the mold.

2. Suction

After clamping the IMD film F10, the IMD film F10 is sucked to conform it to the shape of the mold.

3. Injection Molding

The mold is closed and the resin is injected-molded.

4. Transfer

A pickup robot approaches, and pushes the in-mold molded article (molded article 13) off the stationary side (the transfer layer is peeled off the residual film 12 and transferred onto the resin to constitute a part of a molded article 13).

[Curing Surface of IMD Layer (UV Irradiation Step S07)]

An active energy beam is irradiated toward the surface of the IMD layer to cure the active energy beam-curable resin in the IMD layer.

To cure the active energy beam-curable resin by UV irradiation, the IMD layer is irradiated with UV with a wavelength of 200 to 400 nm from a UV lamp (such as a high-pressure mercury lamp, ultrahigh-pressure mercury lamp, metal halide lamp, high-power metal halide lamp) for a short period of time (in the range of a few seconds to a few dozens of second). To cure the active energy beam-curable resin by electron beam irradiation, the IMD layer is irradiated with a low-energy electron beam from a self-shielding low-energy electron accelerator with a beam energy of 300 keV or lower.

As described above, when the transfer film for in-mold molding of this application is used, the housings of cellular phone terminals, notebook PCs and digital cameras, home electric appliances and cosmetic containers, and automotive parts can be decorated. In addition, the transfer film for in-mold molding of this application is excellent in solvent resistance, heat resistance, durability, blocking resistance and moldability and therefore can provide more durable surface protection.

EXAMPLES

The present invention is described in more detail based on examples. It should be noted that the present invention is not limited by the following examples.

[Formation of Transfer Film for In-Mold Molding 1]

Example 1

Formation of Mold Release Layer

A coating fluid C1 (resin component concentration: 10% by weight) composed of 32.5% by weight of a melamine-based mold release coating agent (Mitsuwa Chemical Lab. Co., Ltd.: ATOM BOND (trade name) RP-30, approximately 30% by weight of a resin component is contained in the product), a 64.9% by weight of a toluene/xylene/2-butanone mixed solvent (Mitsuwa Chemical Lab. Co., Ltd.: ATOM BOND (trade name) R-thinner) as a diluting solvent, 2.6% by weight of a para-toluene sulfonic acid ester (Mitsuwa Chemical Lab. Co., Ltd.: CP catalyst) as a catalyst was prepared.

The obtained coating fluid C1 was applied to the easily-adhesive coating side of a polyethylene terephthalate film (thickness: 50 µm, G440E) manufactured by Mitsubishi Plastics, Inc. as a substrate film L0 with a coating rod (#6) manufactured by RD Specialties, Inc.

The obtained coated film was simultaneously cured and dried for 20 seconds in a high-temperature chamber at 150° C., thereby obtaining a film F1 having a mold release layer L1 with a thickness of 1 µm.

The thickness of the coated film was calculated from the difference between the thicknesses of a coated surface and an uncoated surface measured with Digimicro "MF-501+ Counter TC-101" manufactured by Nikon Corporation.

<Formation of IMD Layer>

A coating fluid C2-1 (resin component concentration: 30% by weight) composed of 56.0% by weight of a photoinitiator-containing UV-reactive acrylic resin (DIC Corporation: UVT Clear (trade name) NSF-001, approximately 37% by weight of a resin component is contained in the product) as an active energy beam-curable resin, 9.0% by weight of an alicyclic multifunctional epoxy resin (Daicel Corporation: Celloxide 3150, epoxy equivalent: 180 g/mol) as a thermosetting resin, 34.5% by weight of 2-butanone (MEK) as a diluting solvent, and 0.5% by weight of a cationic polymerization initiator (Sanshin Chemical Industry Co., Ltd.: Sanaid (trade name) SI-60) as a curing agent was prepared.

The obtained coating fluid C2-1 was applied to the surface of the mold release layer L1 of the film F1 with a coating rod (#16) manufactured by RD Specialties, Inc.

The obtained coated film was dried for 60 seconds in a high-temperature chamber at 140° C., thereby obtaining a film F2-1 having an IMD layer L2-1 with a thickness of 4 µm.

The film F2-1 had a film configuration in which the substrate film L0 (PET), the mold release layer L1 and the IMD layer L2-1 were laminated in this order.

Example 2

A film F2-2 in which a substrate film L0 (PET), a mold release layer L1 and an IMD layer L2-2 were laminated in this order was obtained by repeating the same procedure as in Example 1 except that a coating fluid C2-2 (resin component concentration: 30% by weight) composed of 40.5% by weight of a photoinitiator-containing UV-reactive acrylic resin (DIC Corporation: UVT Clear (trade name) NSF-001), 15.0% by weight of an alicyclic multifunctional epoxy resin (Daicel Corporation: Celloxide 3150, epoxy equivalent: 180 g/mol), 43.6% by weight of 2-butanone (MEK) and 0.9% by weight of a cationic polymerization initiator (Sanshin Chemical Industry Co., Ltd.: Sanaid (trade name) SI-60) was used instead of the coating fluid C2-1 in forming an IMD layer to obtain the IMD layer L2-2.

Comparative Example 1

A film F2-3 in which a substrate film L0 (PET), a mold release layer L1 and an IMD layer L2-3 were laminated in this order was obtained by repeating the same procedure as in Example 1 except that a coating fluid C2-3 (resin component concentration: 30% by weight) composed of 81.0% by weight of a photoinitiator-containing UV-reactive acrylic resin (DIC Corporation: UVT Clear (trade name) NSF-001), and 19.0% by weight of 2-butanone (MEK) as a diluting solvent was used instead of the coating fluid C2-1 in forming an IMD layer to obtain the IMD layer L2-3. In other words, the IMD layer L2-3 did not contain a thermosetting resin.

[Test 1]

The physical properties of the films (F2-1 to F2-3) obtained in Example 1 and 2 and Comparative Example 1 were measured by the following methods.

1) Solvent Resistance Test

2-Butanone (MEK) and ethyl acetate were dripped on the surface of the IMD layer of the film before UV curing, and the film was allowed to stand still for 10 minutes. Then, the droplets were wiped off with Kimwipe (manufactured by Nippon Paper Crecia Co., Ltd.), and it was visually checked if any traces remained.

Evaluation criteria: Good: No trace remaining, Bad: Trace remaining.

2) Blocking Test

The film before UV curing was cut into 100 mm×100 mm pieces, and four pieces were stacked. A 2-kg weight was placed on the stacked pieces, and the sample was allowed to stand still in a constant temperature reservoir (manufactured by As One Corporation, NDH200) at 40° C. for 24 hours. The sample was taken out 24 hours later, and the trace pattern was visually checked to determine the degree of transfer of the IMD layers.

Evaluation criteria: Good: No trace remaining, Bad: Trace remaining.

3) Dynamic Viscoelasticity Test

Only the IMD layer was separated in the form of a film from the film before UV curing. The temperature range in which E' (storage elastic modulus) of the separated film markedly decreased was measured with a viscoelasticity measurement analysis apparatus (DVE-V4 manufactured by UBM) and used as an index of heat resistance.

(Sample size: 5 mm×10 mm, step temperature: 2° C., rate of temperature increase: 5° C./min, basic frequency: 10 Hz, static load control: automatic static load, dynamic stress control, 100 g, strain control: 10 μm, 0.1%, automatic adjustment, strain waveform: sine wave, mode of excitation: stopped excitation)

4) Crack-Generating Elongation

A test piece (width 25 mm×length 200 mm) having a tape adhesive face to which the IMD layer had been transferred was prepared by attaching an acrylic resin-based adhesive tape (manufactured by Nitto Denko Corporation, No. 31B, tape width: 25 mm) to the surface of the IMD layer of the film before UV curing and peeling it off. The prepared test piece was pulled with a tensile tester (manufactured by Orientec Co., Ltd., Tensilon®-250, maximum load capacity: 2.5 kN) at a rate of 2 mm/min with the initial distance between the chucks being 100 mm, and the distance at which the test piece developed cracks was measured.

The crack-generating elongation was obtained according to the following formula.

(Crack-generating distance−Distance between chucks)/Distance between chucks×100

5) Total Light Transmittance

Only the IMD layer was separated in the form of a film from the film before UV curing, and the total light transmittance of the separated film was measured with a haze meter "NDH5000" manufactured by Nippon Denshoku Industries Co., Ltd. according to JIS K7361.

6) Haze

Only the IMD layer was separated in the form of a film from the film before UV curing, and the haze of the separated film was measured with a haze meter "NDH5000" manufactured by Nippon Denshoku Industries Co., Ltd. according to JIS K7136.

7) Surface Free Energy

The contact angle of the surface of the IMD layer of the film before UV curing was measured with a contact angle meter "DM500" manufactured by Kyowa Interface Science Co., LTD. Two types of probe liquids were used; distilled water (for measurement of nitrogen and phosphorus, manufactured by Kanto Chemical, Co., Inc.) and tricresyl phosphate (99%, manufactured by Tokyo Chemical Industry Co., Ltd.). The surface free energy was calculated from the measurement values according to the Kaelble-Uy theory.

8) UV Irradiation

Each of the films obtained in Examples 1 and 2 and Comparative Example 1 was irradiated with ultraviolet rays from a conveyor type UV irradiation apparatus provided with a high-pressure mercury lamp (H08-L41, rating: 160 W/cm, manufactured by Iwasaki Electric Co., Ltd.) from the IMD layer side at an illuminance of 200 mW/cm$^2$ and an exposure of 1000 mJ/cm$^2$ to obtain a UV-cured coating. The exposure was measured with an illuminometer (UVPF-A1/PD-365, manufactured by Iwasaki Electric Co., Ltd.).

9) Measurement of Pencil Hardness

The pencil hardness of the IMD layer side of the film after UV irradiation was measured with surface nature tester HEIDON Type: 14W (manufactured by Shinto Scientific Co., Ltd.) according to JIS K5600.

TABLE 1

| | Film configuration | Ex. 1 F2-1 | Ex. 2 F2-2 | Comp. Ex. 1 F2-3 |
|---|---|---|---|---|
| Film configuration | IMD layer | L2-1 | L2-2 | L2-3 |
| | Mold release layer | L1 | L1 | L1 |
| | Substrate | L0 (PET) | L0 (PET) | L0 (PET) |
| Physical properties of film before UV irradiation | Solvent resistance test | Good | Good | Bad |
| | Blocking test | Good | Good | Bad |
| | Dynamic viscoelasticity test (° C.) | 120 | 160 | 60 |
| | Crack-generating elongation (%) | 2.0 | 1.0 | 0.2 |
| | Total light transmittance (%) | 92 | 92 | 92 |
| | Haze (%) | 1.0 | 1.0 | 1.0 |
| | Surface free energy (mN/m) | 39 | 39 | 33 |
| After UV irradiation | Pencil hardness | 2H | 2H | H |

The results of the dynamic viscoelasticity test and crack-generating elongation test indicate that the films having an IMD layer containing a thermosetting resin (Examples 1 and 2) are significantly improved in heat resistance, and have improved film strength, which leads to improved durability and moldability. The films are also improved in solvent resistance and blocking resistance as well as processing suitability during the film production. In addition, the increase in surface free energy value suggests the improvement in printing suitability during application of the anchor layer.

[Formation of Transfer Film for In-Mold Molding 2]

Example 3

Formation of Anchor Layer

A coating fluid C3-1 (resin component concentration: 20% by weight) composed of 36.8% by weight of a urethane resin (DIC Corporation: UC Sealer (trade name) NA-001, approximately 30% by weight of a resin component is contained in the product), 7.4% by weight of a urethane curing agent (DIC Corporation: N-1, approximately 40% by weight of a resin component is contained in the product), 6.0% by weight of an alicyclic multifunctional epoxy resin (Daicel Corporation: Celloxide 3150, epoxy equivalent: 180 g/mol), 49.5% by weight of 2-butanone (MEK) and 0.3% by weight of a cationic polymerization initiator (Sanshin Chemical Industry Co., Ltd.: Sanaid (trade name) SI-60) was prepared.

The obtained coating fluid C3-1 was applied to the surface of the IMD layer of the film F2-1 with a coating rod (#9) manufactured by RD Specialties, Inc.

The obtained coated film was dried for 60 seconds in a high-temperature chamber at 140° C., thereby obtaining a film F3-1 having an anchor layer L3-1 with a thickness of 2 μm.

The film F3-1 had a film configuration in which the substrate film L0 (PET), the mold release layer L1, the IMD layer L2-1 and the anchor layer L3-1 were laminated in this order. In other words, the film F3-1 was composed of the film F2-1 of Example 1 and an anchor layer L3-1 laminated thereon.

Example 4

A film F3-2 in which a substrate film L0 (PET), a mold release layer L1, an IMD layer L2-2 and an anchor layer L3-1 were laminated in this order was obtained by repeating the same procedure as in Example 3 except that the anchor layer was formed on the film F2-2 instead of the film F2-1. In other words, the film F3-2 was composed of the film F2-2 of Example 2 and an anchor layer L3-1 laminated thereon.

Comparative Example 2

A film F3-3 in which a substrate film L0 (PET), a mold release layer L1, an IMD layer L2-3 and an anchor layer L3-2 were laminated in this order was obtained by repeating the same procedure as in Example 3 except that the film F2-3 was used instead of the film F2-1 and a coating fluid C3-2 (resin component concentration: 20% by weight) composed of 52.6% by weight of a urethane resin (DIC Corporation: UC Sealer (trade name) NA-001), 10.5% by weight of a urethane curing agent (DIC Corporation: N-1) and 36.9% by weight of 2-butanone (MEK) was used instead of the coating fluid C3-1 in forming the anchor layer to obtain the anchor layer L3-2. In other words, the IMD layer L2-3 did not contain a thermosetting resin, and the anchor layer L3-2 did not contain the same thermosetting resin as contained in the IMD layer L2-3. The film F3-3 was composed of the film F2-3 of Comparative Example 1 and an anchor layer L3-2 laminated thereon.

[Test 2]

The physical properties of the films (F3-1 to F3-3) obtained in Example 3 and 4 and Comparative Example 2 were measured by the same methods as used in Test 1.

1) Solvent Resistance Test

2-Butanone (MEK) and ethyl acetate were dripped on the surface of the anchor layer of the film before UV curing, and the film was allowed to stand still for 10 minutes. Then, the droplets were wiped off with Kimwipe (manufactured by Nippon Paper Crecia Co., Ltd.), and it was visually checked if any traces remained.

Evaluation criteria: Good: No trace remaining, Bad: Trace remaining.

2) Blocking Test

The film before UV curing was cut into 100 mm×100 mm pieces, and four pieces were stacked. A 2-kg weight was placed on the stacked pieces, and the sample was allowed to stand still in a constant temperature reservoir (manufactured by As One Corporation, NDH200) at 40° C. for 24 hours. The sample was taken out 24 hours later, and the trace pattern was visually checked to determine the degree of transfer of the anchor layers.

Evaluation criteria: Good: No trace remaining, Bad: Trace remaining.

3) Dynamic Viscoelasticity Test

Only the IMD layer and the anchor layer were separated in the form of a film from the film before UV curing. The temperature range in which E' (storage elastic modulus) of the separated film markedly decreased was measured with a viscoelasticity measurement analysis apparatus (DVE-V4 manufactured by UBM) and used as an index of heat resistance.

(Sample size: 5 mm×10 mm, step temperature: 2° C., rate of temperature increase: 5° C./min, basic frequency: 10 Hz, static load control: automatic static load, dynamic stress control, 100 g, strain control: 10 μm, 0.1%, automatic adjustment, strain waveform: sine wave, mode of excitation: stopped excitation)

4) Crack-Generating Elongation

A test piece (width 25 mm×length 200 mm) having a tape adhesive face to which the transfer layer (the IMD layer and the anchor layer) had been transferred was prepared by attaching an acrylic resin-based adhesive tape (manufactured by Nitto Denko Corporation, No. 31B, tape width: 25 mm) to the surface of the anchor layer of the film before UV curing and peeling it off. The prepared test piece was pulled with a tensile tester (manufactured by Orientec Co., Ltd., Tensilon RTM-250, maximum load capacity: 2.5 kN) at a rate of 2 mm/min with the initial distance between the chucks being 100 mm, and the distance at which the test piece developed cracks was measured.

The crack-generating elongation was obtained according to the following formula.

(Crack-generating distance−Distance between chucks)/Distance between chucks×100

5) Total Light Transmittance

Only the IMD layer and the anchor layer were separated in the form of a film from the film before UV curing, and the total light transmittance of the separated film was measured with a haze meter "NDH5000" manufactured by Nippon Denshoku Industries Co., Ltd. according to JIS K7361.

6) Haze

Only the IMD layer and the anchor layer were separated in the form of a film from the film before UV curing, and the haze of the separated film was measured with a haze meter "NDH5000" manufactured by Nippon Denshoku Industries Co., Ltd. according to JIS K7136.

7) Surface Free Energy

The contact angle of the surface of the anchor layer of the film before UV curing was measured with a contact angle meter "DM500" manufactured by Kyowa Interface Science Co., LTD. Two types of probe liquids were used; distilled water (for measurement of nitrogen and phosphorus, manufactured by Kanto Chemical, Co., Inc.) and tricresyl phosphate (99%, manufactured by Tokyo Chemical Industry Co., Ltd.). The surface free energy was calculated from the measurement values according to the Kaelble-Uy theory.

8) Measurement of Peel Force

A commercially-available adhesive cellophane tape (manufactured by Nichiban Co., Ltd., Cellotape (registered trademark) CT-24, tape width: 24 mm) was attached to the surface of the anchor layer of the film before UV curing, and a pressure was applied by rolling a 2-kg pressure roller once in each direction. Then, the force necessary to separate the mold release layer and the IMD layer of the film was measured 30 minutes after the application of the pressure with a tensile tester (manufactured by Toyo Seiki Seisaku-sho, Ltd., Strograph VES05D, maximum load capacity; 50N).

The value (N/cm) obtained by dividing the force (N) necessary for the separation measured at an angle of 180 degrees and a peel rate of 300 mm/min with the distance between the chucks being 100 mm by the tape width (cm) was adopted as the peel force measurement.

TABLE 2

| | Film configuration | Ex. 3 F3-1 | Ex. 4 F3-2 | Comp. Ex. 2 F3-3 |
|---|---|---|---|---|
| Film configuration | Anchor layer | L3-1 | L3-1 | L3-2 |
| | IMD layer | L2-1 | L2-2 | L2-3 |
| | Mold release layer | L1 | L1 | L1 |
| | Substrate | L0 (PET) | L0 (PET) | L0 (PET) |
| Physical properties of film before UV irradiation | Solvent resistance test | Good | Good | Bad |
| | Blocking test | Good | Good | Bad |
| | Dynamic viscoelasticity test (° C.) | 120 | 160 | 60 |
| | Crack-generating elongation (%) | 2.0 | 1.0 | 0.2 |
| | Total light transmittance (%) | 92 | 92 | 92 |
| | Haze (%) | 1.0 | 1.0 | 1.0 |
| | Surface free energy (mN/m) | 39 | 39 | 33 |
| | Peel force (N/cm) | 0.12 | 0.13 | 0.12 |

The results of the dynamic viscoelasticity test and the crack-generating elongation test indicate that the films having an IMD layer and an anchor layer both containing a thermosetting resin (Examples 3 and 4) are significantly improved in heat resistance, and have improved film strength, which leads to improved durability and moldability. The results also suggest that the films are also improved in solvent resistance and blocking resistance as well as processing suitability during the film production.

[Test 3]

After forming the following layers on the films (F3-1 to F3-3) obtained in Examples 3 and 4 and Comparative Example 2, an injection molding test was conducted.

1) Formation of Print Layer and Adhesion Layer

1) Formation of Print Layer and Adhesion Layer

A print layer L4 (VIC(Z)710 black, manufactured by Seiko Advance Ltd., thickness: 4 μm) and a adhesion layer L5 (JT-27 Base Clear, manufactured by Seiko Advance Ltd., thickness: 2 μm) were sequentially laminated on the anchor layer side of the films (F3-1 to F3-3) obtained in Example 3 and 4 and Comparative Example 2 using a batch screen printer (MINOMAT-e, manufactured by Mino Group Co., Ltd.) equipped with a #300 mesh screen.

2) Injection Molding Test

The film to which the print layer L4 and the adhesion layer L5 had been applied was set in an injection molding apparatus (IS170 (i5), manufactured by Toshiba Machine Co., Ltd) to which a valve gate type test mold for in-mold molding had been attached, and a PC/ABS resin (LUPOY PC/ABS HI5002, manufactured by LG Chem. Ltd.) was injection-molded to produce a transferred molded article.

(Injection conditions: screw diameter of 40 mm, cylinder temperature of 250° C., mold temperature (stationary side, movable side) of 60° C., injection pressure of 160 MPa (80%), holding-pressure of 100 MPa, injection rate of 60 mm/seconds (28%), injection time of 4 seconds and cool-down period of 20 seconds)

The appearance of the gate part and deep-drawn corner parts of the obtained transferred molded article was visually checked.

Evaluation criteria for gate part: Good: flow of resin or ink not observed, Bad: flow of resin or ink observed Evaluation criteria for deep-drawn corner parts: Good: No crack developed, Bad: crack developed 3) UV Irradiation The transferred molded article obtained was irradiated with ultraviolet rays from a conveyor type UV irradiation apparatus provided with a high-pressure mercury lamp (H08-L41, rating: 160 W/cm, manufactured by Iwasaki Electric Co., Ltd.) from the transfer layer side at an illuminance of 200 mW/cm$^2$ and an exposure of 1000 mJ/cm$^2$ to obtain a UV-cured coating. The exposure was measured with an illuminometer (UVPF-A1/PD-365, manufactured by Iwasaki Electric Co., Ltd.).

4) Measurement of Pencil Hardness

The pencil hardness of the transfer layer side of the transferred molded article after UV irradiation was measured with surface nature tester HEIDON Type: 14W (manufactured by Shinto Scientific Co., Ltd.) according to JIS K5600.

5) Adhesion Test

The transferred molded article after UV irradiation was immersed in 70° C. hot water for 30 minutes. After drying, eleven cuts were formed in the transfer layer side in both lengthwise and widthwise directions at an interval of 1 mm to form a hundred squares. A commercially available adhesive cellophane tape (manufactured by Nichiban Co., Ltd., Cello-tape (registered trademark) CT-24, tape width: 24 mm) was firmly attached and quickly peeled off forwardly at an angle of 90 degrees. The number of squares in which the coating remained unpeeled was counted. This method is according to JIS K5400.

TABLE 3

| | Film configuration | Ex. 3 F3-1 +Print layer + Adhesion layer | Ex. 4 F3-2 +Print layer + Adhesion layer | Comp. Ex. 2 F3-3 +Print layer + Adhesion layer |
|---|---|---|---|---|
| In-mold injection molding test | Appearance of gate part | Good | Good | Bad |
| | Deep-drawn corner parts | Good | Good | Bad |
| After UV irradiation | Pencil hardness | 2H | 2H | H |
| | Adhesion test | 100/100 | 100/100 | 85/100 |

The results indicate that the films having an IMD layer and an anchor layer both containing a thermosetting resin (Examples 3 and Example 4) can prevent gate flow during injection molding and have improved ability to conform to three-dimensional structure part. In other words, the films are excellent in moldability. The results also suggest that the films have improved hardness after UV irradiation, and are improved in adhesion between the layers. In other words, the films are excellent in durability.

[Formation of Transfer Film for In-Mold Molding 3]

<Synthesis of Polymer A-1>

A compound that exhibits a surface modifying function (polymer A-1) was synthesized.

A chemical substance A (fluorosilsesquioxane compound) (11.25 g), methyl methacrylate (MMA, 33.75 g) and 2-butanone (MEK, 104.41 g) were charged in a four-neck flask (300 ml) equipped with a nitrogen-sealed reflux condenser, a thermometer, stirring blades and a septum. After the flask was heated in an oil bath to reflux the mixture for 15 minute, an azobis(isobutyronitrile) (AIBN)/MEK solution (10% by weight, 5.8683 g) was added to initiate polymerization. After allowing the mixture to react for 5 hours, the AIBN/MEK solution (10% by weight, 5.8683 g) was further added and the mixture was aged for 3 hours. The reaction was terminated when gas chromatography showed that the monomer conversion rate reached saturation, whereby an intended MEK solution of polymer A-1 was obtained. The monomer composition, fluorine concentration: F-concentration, weight-average molecular weight: Mw and polydispersity index: Mw/Mn of the obtained polymer A-1 are shown in Table 4. The weight-average molecular weight and polydispersity index were measured with a gel permeation chromatography (GPC, model number: Alliance 2695, manufactured by Waters Corp, column: Shodex GPC KF-804L×2 (connected in series), guard column: KF-G).

The chemical substance A has a molecular structure represented by formula (I) below.

[Chemical Formula 2]

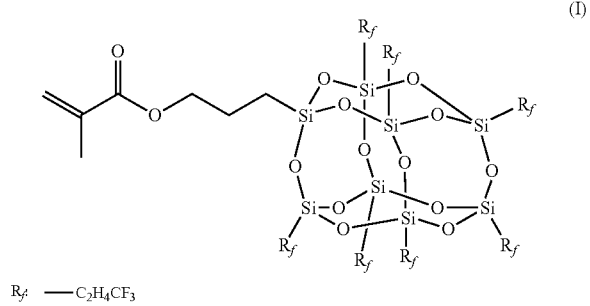

(I)

$R_f$: —$C_2H_4CF_3$

TABLE 4

| Polymer | Copolymer composition (% by weight) | | F concentration (%) | Mw (Mw/Mn) |
|---|---|---|---|---|
| | Chemical substance A | MMA | | |
| A-1 | 25 | 75 | 8.2 | 21,000 (1.7) |

Example 5

Formation of Mold Release Layer

A film F1 having a mold release layer L1 was obtained by the same method as in Example 1.

<Formation of IMD Layer Having Surface Modifying Layer>

An MEK solution of polymer A-1 was applied to the surface of the mold release layer L1 of the film F1 with a coating rod (#6) manufactured by RD Specialties, Inc.

The obtained coated film was dried for 60 seconds in a high-temperature chamber at 80° C., thereby obtaining a surface modifying layer with a thickness of 2 µm.

Next, a coating fluid C2-1 (resin component concentration: 30% by weight) composed of 56.0% by weight of a photoinitiator-containing UV-reactive acrylic resin (DIC Corporation: UVT Clear (trade name) NSF-001, approximately 37% by weight of a resin component is contained in the product) as an active energy beam-curable resin, 9.0% by weight of an alicyclic multifunctional epoxy resin (Daicel Corporation: Celloxide 3150, epoxy equivalent: 180 g/mol) as a thermosetting resin, 34.5% by weight of 2-butanone (MEK) as a diluting solvent, and 0.5% by weight of a cationic polymerization initiator (Sanshin Chemical Industry Co., Ltd.: Sanaid (trade name) SI-60) as a curing agent was prepared.

The obtained coating fluid C2-1 was applied to the surface of the surface modifying layer with a coating rod (#16) manufactured by RD Specialties, Inc.

The obtained coated film was dried for 60 seconds in a high-temperature chamber at 140° C., thereby obtaining a film F2-4 having an IMD layer L2-4 which had a surface modifying layer and had a thickness of 6 µm (including 2 µm for the surface modifying layer).

<Formation of Anchor Layer>

A coating fluid C3-1 was prepared by the same method as in Example 3.

The obtained coating fluid C3-1 was applied to the surface of the IMD layer of the film F2-4 with a coating rod (#9) manufactured by RD Specialties, Inc.

The obtained coated film was dried for 60 seconds in a high-temperature chamber at 140° C., thereby obtaining a film F3-4 having an anchor layer L3-1 with a thickness of 2 µm.

In other words, the film F3-4 had a film configuration in which the substrate film L0 (PET), the mold release layer L1, the IMD layer L2-4 and the anchor layer L3-1 were laminated in this order. The IMD layer L2-4 had a surface modifying layer.

Example 6

Formation of Film Having IMD Layer Containing Surface Modifying Component

A film F3-5 was obtained by repeating the same procedure as in Example 5 except that no surface modifying layer was formed and a coating fluid C2-4 prepared by adding an MEK solution of polymer A-1 as a surface modifying component to C2-1 in an amount of 1% based on the resin component concentration of C2-1 was used in forming an IMD layer to obtain an IMD layer L2-5.

In other words, the film F3-5 had a film configuration in which the substrate film L0 (PET), the mold release layer L1, the IMD layer L2-5 and the anchor layer L3-1 were laminated in this order. The IMD layer L2-5 contained a surface modifying component.

[Test 4]

After forming the following layers on the films (F3-1, F3-4 and F3-5) obtained in Examples 3, 5 and 6, an injection molding test was conducted.

1) Formation of Print Layer and Adhesion Layer

A print layer L4 (VIC(Z)710 black, manufactured by Seiko Advance Ltd., thickness: 4 µm) and a adhesion layer L5 (JT-27 Base Clear, manufactured by Seiko Advance Ltd., thickness: 2 µm) were sequentially laminated on the anchor layer side of the films (F3-1 F3-4 and F3-5) obtained in Example 3, 5 and 6 using a batch screen printer (MINOMAT-e, manufactured by Mino Group Co., Ltd.) equipped with a #300 mesh screen.

2) Injection Molding Test

The film to which the print layer L4 and the adhesion layer L5 had been applied was set in an injection molding apparatus (IS170 (i5), manufactured by Toshiba Machine Co., Ltd) to which a valve gate type test mold for in-mold molding had been attached, and a PC/ABS resin (LUPOY PC/ABS HI5002, manufactured by LG Chem. Ltd.) was injection-molded to produce a transferred molded article.

(Injection conditions: screw diameter of 40 mm, cylinder temperature of 250° C., mold temperature (stationary side, movable side) of 60° C., injection pressure of 160 MPa (80%), holding-pressure of 100 MPa, injection rate of 60 mm/seconds (28%), injection time of 4 seconds and cooldown period of 20 seconds)

The appearance of the gate part and deep-drawn corner parts of the obtained transferred molded article was visually checked.

Evaluation criteria for gate part: Good: flow of resin or ink not observed, Bad: flow of resin or ink observed Evaluation criteria for deep-drawn corner parts: Good: No crack developed, Bad: crack developed 3) UV Irradiation The transferred molded article obtained was irradiated with ultraviolet rays from a conveyor type UV irradiation apparatus provided with a high-pressure mercury lamp (H08-L41, rating: 160 W/cm, manufactured by Iwasaki Electric Co., Ltd.) from the transfer layer side at an illuminance of 200 mW/cm$^2$ and an exposure of 1000 mJ/cm$^2$ to obtain a UV-cured coating. The exposure was measured with an illuminometer (UVPF-A1/PD-365, manufactured by Iwasaki Electric Co., Ltd.).

4) Surface Free Energy

The contact angle of the transfer layer side of the transferred molded article after UV irradiation was measured with a contact angle meter "DM500" manufactured by Kyowa Interface Science Co., LTD. Two types of probe liquids were used; distilled water (for measurement of nitrogen and phosphorus, manufactured by Kanto Chemical, Co., Inc.) and tricresyl phosphate (99%, manufactured by Tokyo Chemical Industry Co., Ltd.). The surface free energy was calculated from the measurement values according to the Kaelble-Uy theory.

5) Measurement of Pencil Hardness

The pencil hardness of the transfer layer side of the transferred molded article after UV irradiation was measured with surface nature tester HEIDON Type: 14W (manufactured by Shinto Scientific Co., Ltd.) according to JIS K5600.

6) Adhesion Test

The transferred molded article after UV irradiation was immersed in 70° C. hot water for 30 minutes. After drying, eleven cuts were formed in the transfer layer side in both lengthwise and widthwise directions at an interval of 1 mm to form a hundred squares. A commercially available adhesive cellophane tape (manufactured by Nichiban Co., Ltd., Cellotape (registered trademark) CT-24, tape width: 24 mm) was firmly attached and quickly peeled off forwardly at an angle of 90 degrees. The number of squares in which the coating remained unpeeled was counted. This method is according to JIS K5400.

TABLE 5

| | | Ex. 3<br>F3-1<br>+Print<br>layer +<br>Adhesion<br>layer | Ex. 5<br>F3-4<br>+Print<br>layer +<br>Adhesion<br>layer | Ex. 6<br>F3-5<br>+Print<br>layer +<br>Adhesion<br>layer |
|---|---|---|---|---|
| Film<br>configuration | Anchor layer | L3-1 | L3-1 | L3-1 |
| | IMD layer<br>(surface modifying<br>layer) | L2-1<br>(none) | L2-4<br>(exist) | L2-5<br>(none*) |
| | Mold release layer | L1 | L1 | L1 |
| | Substrate | L0 (PET) | L0 (PET) | L0 (PET) |
| In-mold<br>injection<br>molding test | Appearance of gate<br>part | Good | Good | Good |
| | Deep-drawn corner<br>parts | Good | Good | Good |
| After UV<br>irradiation | Surface free energy<br>(mN/m) | 31 | 26 | 27 |
| | Pencil hardness | 2H | 3H | 3H |
| | Adhesion test | 100/100 | 100/100 | 100/100 |

*L2-5 contains a surface modifying component.

The film having an IMD layer including a surface modifying layer (Example 5) and the film having an IMD layer containing a surface modifying component (Example 6) can have higher hardness on the transferred molded article after UV irradiation than the film of Example 3 (film having no surface modifying layer or film containing no surface modifying component). The results also suggest that the films reduce the surface free energy. This means that the films have excellent water/oil repellency, which leads to the impartation of an antifouling function.

Use of the terms "a," "an," "the" and similar referents used in the context in explanation of the invention (particularly in the context of claims as described below) is to be construed to cover both the singular form and the plural form, unless otherwise indicated herein or clearly contradicted by context. The terms "comprising," "having," "including" and "containing" are to be construed as open-ended terms (more specifically, meaning "including, but not limited to") unless otherwise noted. Recitation of ranges of values herein are merely intended to serve as a shorthand method of referring individually to each separate value falling within the range, unless otherwise indicated herein, and each separate value is incorporated herein as if it were individually recited herein. All methods described herein can be performed in any suitable order unless otherwise indicated herein or otherwise clearly contradicted by context. The use of any and all examples, or exemplary language ("such as") provided herein, is intended merely to better illuminate the invention and does not pose a limitation on the scope of the invention unless otherwise claimed. No language herein should be construed as indicating any non-claimed element as essential to the practice of the invention.

Preferred embodiments of the invention are described herein, including the best mode known to the present inventors for carrying out the invention. Variations of the preferred embodiments may become apparent to those skilled in the art upon reading the foregoing description. The present inventors expect skilled artisans to employ such variations as appropriate, and the present inventors intend for the invention to be practiced otherwise than as specifically described herein. Accordingly, the invention includes all modifications and equivalents of the subject matter recited in the claims appended hereto as permitted by applicable law. Moreover, any combination of the elements in all possible variations thereof is encompassed by the invention unless otherwise indicated herein or otherwise clearly contradicted by context.

DESCRIPTION OF REFERENCE NUMERALS AND SYMBOLS

L0 Substrate
L1 Mold release layer
L2, L2' IMD layer
L2a Surface modifying layer L2*b* IMD layer in the IMD layer L2' except the surface modifying layer L2*a*
L3, Anchor layer
L4 Print layer
L5 Adhesion layer
L6 Protective layer
L7 Resin
F10 F10' Transfer film for in-mold molding
11 Transfer layer
12 Residual film
13 Molded article
S01-S05 Step
S06 Injection molding step
S07 UV irradiation step

What is claimed is:

1. A transfer film for in-mold molding, comprising:
a transfer layer to be transferred onto an in-mold molded article and to be cured by irradiation of an active energy beam after the transfer; and
a film-like substrate;
wherein the transfer layer has an IMD layer that is laminated on the substrate and an anchor layer laminated on the side of the IMD layer opposite the substrate, the IMD layer will form the outermost layer of the molded article after in-mold molding, and the anchor layer contains a cured thermosetting resin that enhances the adhesion between the IMD layer and a layer laminated on the IMD layer; and
the IMD layer is composed of a mixed composition containing at least one active energy beam-curable resin and at least one thermosetting resin, and at least one thermosetting resin contained in the IMD layer is of the same type as the thermosetting resin contained in the anchor layer.

2. The transfer film for in-mold molding according to claim 1,
wherein the IMD layer of the transfer layer contains the thermosetting resin which has been cured by heating before the transfer.

3. The transfer film for in-mold molding according to claim 2,
wherein the thermosetting resin contains at least one of an epoxy resin, a melamine resin and a urethane resin.

4. The transfer film for in-mold molding according to claim 2,
wherein the IMD layer contains a surface modifying component or has a surface modifying layer on the surface that will become a surface of the molded article.

5. The transfer film for in-mold molding according to claim 4,
wherein the surface modifying component or the surface modifying layer contains one or more selected from a silicone compound, a fluorine compound and a compound containing fluorosilsesquioxane.

6. The transfer film for in-mold molding according to claim 2,
wherein the transfer layer further includes:
a print layer laminated on the anchor layer; and
an adhesion layer laminated on the print layer.

7. A method for the production of an in-mold molded article, comprising the steps of:
placing a transfer film for in-mold molding according to claim 2 on a mold with the substrate facing the mold; and
injecting a resin for in-mold molding onto the transfer film for in-mold molding.

8. The transfer film for in-mold molding according to claim 1,
wherein the thermosetting resin contains at least one of an epoxy resin, a melamine resin and a urethane resin.

9. The transfer film for in-mold molding according to claim 1,
wherein the IMD layer contains a surface modifying component or has a surface modifying layer on the surface that will become a surface of the molded article.

10. The transfer film for in-mold molding according to claim 9,
wherein the surface modifying component or the surface modifying layer contains one or more selected from a silicone compound, a fluorine compound and a compound containing fluorosilsesquioxane.

11. The transfer film for in-mold molding according to claim 1,
wherein the transfer layer further includes:
a print layer laminated on the anchor layer; and
an adhesion layer laminated on the print layer.

12. A method for the production of an in-mold molded article, comprising the steps of:
placing a transfer film for in-mold molding according to claim 1 on a mold with the substrate facing the mold; and
injecting a resin for in-mold molding onto the transfer film for in-mold molding.

* * * * *